(12) United States Patent
Lipman et al.

(10) Patent No.: US 6,192,051 B1
(45) Date of Patent: Feb. 20, 2001

(54) NETWORK ROUTER SEARCH ENGINE USING COMPRESSED TREE FORWARDING TABLE

(75) Inventors: Michael E. Lipman, Harvard; Russell L. Heyda, Lexington, both of MA (US)

(73) Assignee: Redstone Communications, Inc., Westford, MA (US)

( * ) Notice: Under 35 U.S.C. 154(b), the term of this patent shall be extended for 0 days.

(21) Appl. No.: 09/259,064

(22) Filed: Feb. 26, 1999

(51) Int. Cl.[7] .................................................. H04L 12/56
(52) U.S. Cl. .................... 370/389; 370/400; 370/408; 709/238; 709/241
(58) Field of Search ..................................... 370/254, 256, 370/235, 238, 389, 400, 408, 390, 392, 393, 396; 709/238, 241, 242

(56) References Cited

U.S. PATENT DOCUMENTS

| 5,412,654 | * | 5/1995 | Perkins ................................. 370/312 |
| 5,842,224 | * | 11/1998 | Fenner ................................. 711/202 |
| 5,870,739 | * | 2/1999 | Davis, III et al. ...................... 707/4 |
| 5,946,679 | * | 8/1999 | Ahuja et al. ............................ 707/3 |
| 6,011,795 | * | 1/2000 | Varghese et al. ..................... 370/392 |
| 6,014,659 | * | 1/2000 | Wilkinson, III et al. ................ 707/3 |
| 6,052,683 | * | 4/2000 | Irwin ....................................... 707/8 |
| 6,061,712 | * | 5/2000 | Tzeng ................................... 709/202 |

OTHER PUBLICATIONS

Degermark, M., et al. "Small Forwarding Tables for Fast Routing Lookups" Proceedings of the ACM SIGCOMM '97 Conference on Applications, Technologies, Architectures and Protocols for Computer Communications (Student Paper Award), Cannes, France, Sep. 1997.

* cited by examiner

*Primary Examiner*—Scema S. Rao
*Assistant Examiner*—Saba Tsegaye
(74) *Attorney, Agent, or Firm*—Weingarten, Schurgin, Gagnebin & Hayes LLP

(57) ABSTRACT

Network routing apparatus employs multi-level tree data structures in a centralized routing table and in distributed forwarding tables. Each level of each structure is associated with a different field of a network address appearing in received packets. Pointers in each structure are used to identify either an address of a next hop network, or a next-level tree to be examined for a next-hop address. An uncompressed tree routing table uses directly addressed trees in order to simplify the storage and retrieval of pointers, and the next-tree pointers directly identify next trees. Compressed tree forwarding tables are generated from the uncompressed routing table by reducing the number of pointers stored at one or more levels to substantially the number of unique next hop addresses associated with network addresses at that level. A single mapping table maps pointer values at one level to the locations of trees at the next level in the compressed trees. Next hop address lookup logic performs lookups in accordance with the structure of the compressed trees. Also, the lookup logic stores and selectively operates on multiple forwarding tables in order to provide support for virtual router operation.

14 Claims, 15 Drawing Sheets

NETWORK ROUTER SEARCH ENGINE USING COMPRESSED TREE FORWARDING TABLE

BACKGROUND OF THE INVENTION

The present invention is related to the field of data networks, and more particularly to the routing of data packets from a source node to a destination node within a network.

One primary function of data networks is the routing of data packets or frames from a source network node to one or more destination network nodes. When a network device receives a packet or frame, the device examines the packet or frame in order to determine how the packet or frame is to be forwarded. Similar forwarding decisions are made as necessary at multiple intermediate network devices until the packet or frame is received at a desired destination node. This type of operation is in contrast to networks employing switching techniques, in which routes are pre-established as "circuits" and each network device simply forwards each received packet on its associated circuit. One example of a routed network is the Internet, which employs a protocol known as the Internet Protocol (IP) for routing data packets through the Internet.

There is a growing demand for Internet and other data network services. As a result, there is an increasing volume of routed data traffic such as IP traffic being carried on high-bandwidth data channels, such as the well-known T1 and T3 signals used to carry data and digitized voice in the public telephone system. Along with this increase in routed traffic is an increased demand for high-throughput routers that can make forwarding decisions at very high rates.

To accomplish the task of routing data packets through a network from a source node to a destination node, data networks commonly employ a distributed routing procedure. Network routers maintain routing tables to carry out the routing function. When a packet arrives at a router, an address contained within the packet (for example the destination address) is used to retrieve an entry from the routing table that indicates the next hop, or next node, along a desired route to the destination node. The router then forwards the packet to the indicated next hop node. The process is repeated at successive router nodes until the packet arrives at the desired destination node.

The routing tables in the routers are maintained according to any of a variety of distributed routing protocols. For example, one well-known routing protocol is known as OSPF, which is an acronym for "Open Shortest Path First". The routers collect information about the activation and deactivation of network links among neighboring nodes, and the information is communicated among the routers according to the routing protocol. Routes are created, updated, and deleted as needed according to network conditions. All of the pertinent routing-related information is contained collectively within the routing tables maintained at the routers.

A routing table entry includes a 2-part mapping between an address such as a destination address and an associated next hop address. It is common for the destination address portion to include a subnet mask value indicating that some of the address bits are to be matched precisely and others need not be. An example of an entry in an Internet Protocol (IP) routing table is the following:

128.4.0.0/16 100.0.0.0

This entry uses the known convention of representing a 32-bit IP address as a string of four bytes (most significant to least significant) separated by decimal points, where the value of each byte is given as a decimal equivalent. This entry indicates that any packet having a destination address whose 16 most significant bits are equal to 128.4 (10000000 00000100 binary), should be routed to the network node having IP address 100.0.0.0 (01100100 00000000 00000000 00000000 binary). An example of a matching destination address is 128.4.10.9; an example of a non-matching address is 128.120.0.0.

The example above illustrates the concept of aggregation of IP addresses for routing purposes. All IP addresses whose upper 16 bits are equal to 128.4 are routed to the same next hop node. Since IP addresses are 32-bit values, there are $2^{(32-16)}=2^{16}=64K$ such addresses. These addresses are said to be aggregated in the routing table. It will be appreciated that shorter subnet masks correspond to greater aggregation, while longer subnet masks correspond to less aggregation. In addition, this format for a routing entry can also be used for route summarization, a technique similar to aggregation that is used by routing protocols.

The mapping from the set of all possible destination addresses to the set of all possible next hops can be represented as a binary tree, in which each bit of the destination address dictates which branch is taken at a corresponding level in the search for the next hop. For an n-bit address, a tree of height n is required. A fully populated tree has $2^n$ distinct leaves at the end of $2^n$ distinct search paths, where each leaf corresponds to a next hop value. However, a tree representing a set of routing entries typically contains far fewer leaves. The number of leaves required is influenced by the number of entries in the routing table, and also the degree to which network addresses are aggregated. If the network address space is divided into a relatively large number of sub-spaces each of which is assigned a different route, more leaves are needed than when the network address space is divided into a smaller number of sub-spaces having distinct routes. Most networks exhibit substantial address aggregation, so that even in large networks the mapping tree used for routing at a given node tends to be "sparse", i.e. not very fully populated. For example, the routing entry given above corresponds to a single leaf at location 16 of the tree, and it covers the range of 64K addresses from 128.4.0.0 through 128.4.255.255.

The simplest way conceptually to look up a next hop address is to use a conventional random-access memory having a binary address input and a data storage location associated with each unique address value. A next hop value is stored at the storage location corresponding to each address. The next hop is looked up in the memory by simply retrieving the value stored at the memory location indicated by the address included in a received packet. When a group of addresses are aggregated, such as in the above example, the next hop value used by the aggregation would be replicated at each aggregated address in the memory. Thus in the foregoing example the entry 100.0.0.0 would appear at locations 128.4.0.0 through 128.4.255.255 of such a memory.

While conceptually simple, such an approach is not practically feasible for typical network address spaces. The amount of memory required based on typical network address lengths is prohibitively large. For example, 4 billion memory locations are required to fully decode 32-bit IP addresses. Also, this approach is inefficient when the tree is even modestly sparse. For these reasons, network routers have generally employed alternative means of storing and retrieving the tree elements.

Many contemporary routers employ what is referred to as a Patricia tree representation of the mapping from destination addresses to next hops. During a search, a Patricia tree is traversed in binary fashion in the direction from most significant to least significant address bits. The Patricia tree structure achieves significantly greater storage efficiency than the simplistic approach described above. However, worst-case searches can potentially require 32 memory references. Thus the performance of a router using a Patricia tree is undesirably sensitive to network topology and address assignments.

The logical partitioning and layout of functional components within the router also affect router performance. A common configuration for a contemporary router is a collection of line cards interconnected by a switching fabric. Each line card has one or more ports each attached to a corresponding physical network medium. When a packet arrives at a line card port, a forwarding engine on the line card determines which port the packet should be forwarded to, and then forwards the packet to the corresponding line card through the switch fabric. The receiving line card then transmits the packet onto the appropriate network segment. The forwarding engine may be implemented using a general-purpose microprocessor executing special-purpose forwarding software, or may alternatively be implemented using special-purpose hardware. A software approach is favored when the speed of lookups is secondary to other considerations, such as ease of revision. A hardware approach is favored when the speed of lookups is paramount, for example on line cards used with very high-speed networks.

It is known to maintain the routing information within a centralized component such as a system controller within a router of the foregoing type, and for each forwarding engine to consult the system controller in order to obtain a route for each received packet. This approach has the advantage that only a single copy of the routing information is maintained within the router, so that the information can be updated readily and the most up-to-date information is automatically used for route determination. However, the system controller in such routers rapidly becomes a bottleneck, especially in light of the recent tremendous growth in the volume of network traffic.

To reduce the effect of a limited-capacity system controller on router performance, it has become more common for routing information to be distributed in multiple readily accessible locations in a router. In one approach a forwarding table is employed on the line cards to map the destination address of each received packet to the identity of the port to which the packet should be forwarded. The forwarding table contains a subset of the information from the routing table. The system controller updates the forwarding tables on the various line cards as changes to the routing table occur. The use of distributed forwarding tables increases parallelism in the router. Also, if the forwarding tables are small enough they can be placed into relatively fast-access storage on the line cards, which further enhances performance.

In some routers the forwarding tables are cached copies of one or more sections of the routing table. This technique exploits address locality appearing in the network traffic. Most of the next hop lookups are done on the line card when the hit rate in the cache is high. However, there are circumstances in which the hit rate in the cache cannot be maintained at an adequately high level. If the cache is too small relative to the number of different addresses received by the line card over a given interval, the cache may begin to thrash. When thrashing occurs, entries are repeatedly swapped out of the cache prematurely, substantially decreasing the hit rate. Each lookup that misses in the cache incurs delay while the needed entry is fetched from the system controller. As a result, overall performance of the router is degraded.

In a technique described by Degermark et al. in a paper entitled "Small Forwarding Tables for Fast Routing Lookups", small forwarding tables that contain all the necessary routing information are used in the line cards. A microprocessor on each line card executes a lookup algorithm using the data stored in the corresponding forwarding table. The technique uses a 3-level prefix tree representation of the mapping from destination network addresses to next hop addresses, and the inherent sparseness of the prefix tree is exploited to achieve considerable storage efficiency. Level 1 of the prefix tree is associated with bits <31:16> of the IP address from packets arriving at the router. Levels 2 and 3 of the prefix tree are associated with bits <15:8> and <7:0> of the IP address respectively.

In the technique of Degermark et al., routing entries that aggregate addresses having up to 16 of their most significant bits in common have corresponding entries in the level 1 tree, and require no space in either the level 2 or level 3 trees. Routing entries that aggregate addresses having between 17 and 24 of their most significant bits in common require space in both the level 1 and the level 2 trees. For these routing entries, the level 1 tree contains node entries that point to chunks in the level 2 tree that contain the corresponding leaves. For routing entries that aggregate addresses having between 25 and 32 most significant bits in common, the chunks in the level 2 tree contain node entries that point to chunks in the level 3 tree that contain the leaf entries. The levels are searched in order as deep as necessary using the respective bits of the IP address to retrieve the desired next hop value.

The technique shown in the Degermark et al. paper achieves considerable storage efficiency, so that small but complete forwarding tables can be stored on each line card. At each level of the prefix tree, storage is used only to store the required leaf and node information; little or no storage is left empty as a result of tree sparseness. A multi-level mapping structure within each level maps aggregated addresses to a single leaf or node entry used by all members of the aggregation. Thus for an exemplary routing entry such as (128.4.0.0/16—100.0.0.0), the Degermark forwarding table would contain a single leaf, and each address in the range from 128.4.0.0 through 128.4.255.255 would be mapped to the location of the single leaf.

While the technique shown in the Degermark et al. paper achieves considerable storage efficiency, it does so at the cost of complexity, notably in the multi-level mapping used at each level to extract the desired node or leaf based on the corresponding bits of the IP address. It would be desirable, however, for next hop lookups to be performed in a manner better suited to high-performance hardware implementation. Also, the Degermark et al. paper does not address performance issues that may arise from the manner of creating and maintaining the various data structures during dynamic network operation when routes are being added, deleted, or changed. A practical router must have an efficient means of re-generating the forwarding tables as necessary to keep up with changes in the routing topology as dictated by the routing protocol being followed.

BRIEF SUMMARY OF THE INVENTION

In accordance with the present invention, network routing apparatus and associated methods and data structures are disclosed in which high route lookup rates are achieved for a large number of network data streams. Complete forwarding tables are stored efficiently in memory on each line card, and are organized such that route lookups are performed simply, rapidly and efficiently. Also, a central routing table is organized in a manner that enables fast and efficient updating of the forwarding tables, so that the router can react quickly to changes in the network topology while maintaining high route lookup rates.

The disclosed network router apparatus employs a multi-level prefix tree forwarding table organized in a manner that enables fast and efficient lookups in hardware. A first-level tree is directly addressed by a first field of a network address, so that a pointer can be retrieved using only a single memory lookup. Compression is achieved by providing for the storage of either dense or sparse trees at other levels. Dense trees are directly addressed, so that pointer lookup is done with a single memory reference. Sparse trees are used to store pointers using less redundancy than exhibited by the dense trees. The number of pointers in a sparse tree is on the order of the number of unique routing entries associated with the corresponding set of addresses. A mapping table is used to map pointers from one level to trees at the next lower level, so that the number of memory references required for retrieving lower-level trees is minimized.

The routing apparatus maintains an uncompressed multi-level tree routing table in order to enhance the efficiency with which the forwarding table is re-created during operation. The uncompressed tree employs pointers that point to either routing entries stored in a linked list for ease of insertion and removal, or to next-level trees directly without any intervening mapping structures. The trees at each level are directly addressed, so that each pointer lookup is done in a single direct memory reference. The forwarding table is generated in a straightforward manner by traversing the uncompressed tree and performing a regular set of operations on each entry during the traversal. The levels of the forwarding table are generated in a recursive manner from the levels of the uncompressed routing table.

The routing apparatus also employs lookup logic that is tailored to perform fast lookups at high rates. The routing apparatus supports what are referred to as "virtual" routers by providing for the storage and use of multiple forwarding tables on each line card and a protocol for selecting the appropriate forwarding table for a given lookup. These features enable the routing apparatus to support multiple virtual networks as a straightforward extension of the basic routing functionality, significantly enhancing the range of possible applications of the disclosed apparatus.

Other aspects, features, and advantages of the present invention are disclosed in the detailed description, which follows.

DETAILED DESCRIPTION OF THE INVENTION

Figure 1:
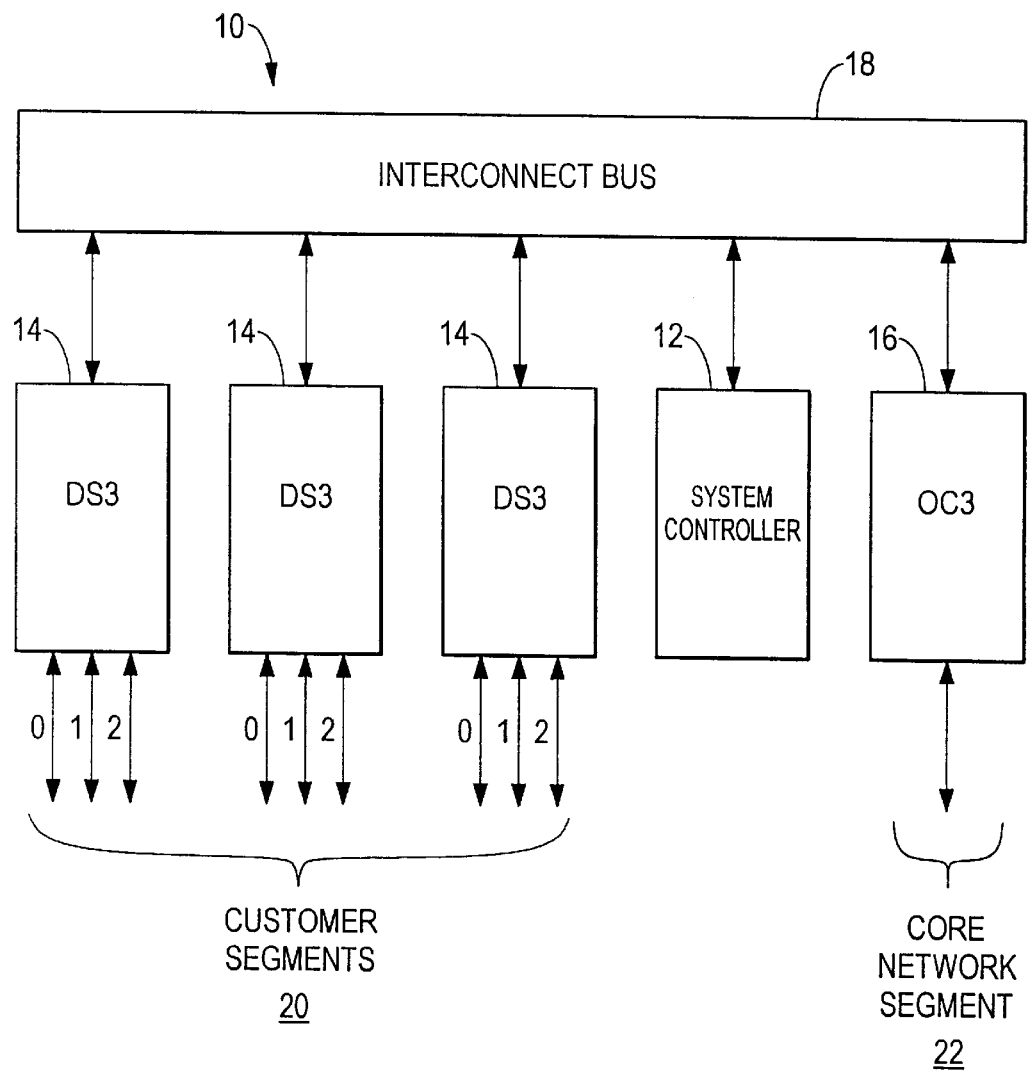
FIG. 1 is a block diagram of a network router device according to the principles of the present invention.

FIG. 1 shows a router 10 including a system controller card 12, a number of DS3 cards 14 and an OC3 card 16. As is known in the art, the acronym DS3 represents a multiplexed digital signal with a data rate of approximately 45 Mb/s, representing 28 multiplexed DS1 signals or 672 64-Kb/s DS0 signals. DS3 and DS1 are also referred to respectively as "T3" and "T1". The acronym "OC3" represents a 155 Mb/s optical carrier signaling protocol. The cards 14 and 16 interface to an interconnect bus 18 to enable the cards to exchange data. The DS3 cards 14 are connected to DS3 network segments denoted as "customer segments" 20 in FIG. 1. Each card 14 is connected to three DS3 segments, the segments being labeled 0, 1 and 2 for each card 14. The OC3 card 16 is connected to an OC3 segment denoted as "core network segment" 22. As the names of the segments 20 and 22 indicate, the router 10 is intended for use at an intermediate hierarchical position in a data network. For example, the router 10 transfers packets between a large number of customers reachable via the customer segments 20 and a smaller number of high-traffic, medium-to-long haul data communication devices reachable via the core network segments 22.

In a known fashion, communications on the segments 20 and 22 are carried out in a hierarchical manner, in general accordance with the principles reflected in the well-known 7-layer Open Systems Interconnect (OSI) model promulgated by the International Standards Organization (ISO). The following description employs descriptive terminology according to that model. In particular, the device 10 operates primarily at the lowest 3 layers of the OSI model, which are in ascending order the physical, data link, and network layers. At the network layer, the device 10 implements the Internet Protocol (IP) for routing datagrams among various source and destination network nodes (although IP does not follow the OSI model strictly). As described below, at layer 2 the device 10 employs several protocols including Point-to-Point Protocol (PPP), Frame Relay, and Asynchronous Transfer Mode (ATM). The device 10 also employs multiple protocols at the physical layer as described below.

At the physical layer, each customer segment 20 employs the channelized T3 protocol, which operates at approximately 45 Mbps. Channelized T3 signals include 28 DS1 channels, each of which operates at 1.544 Mbps, and each DS1 channel carries 24 "DS0" channels each operating at up to 64 Kbps. As described in greater detail below, these channels are assigned to higher-level "circuits" at the network layer where routing occurs. The core network segment 22 employs 155 Mb/s OC3 optical signaling. The OC3 traffic is likewise assigned to higher-level "circuits" as described below.

The system controller 12 carries out a number of operations in support of the overall operation of the router 10. One operation performed by the system controller 12 is the management of the routing function at the network layer. The system controller 12 maintains a large routing database, referred to as a routing table, which is used to enable the device 10 to make decisions regarding how packets received on a segment 20 or 22 are to be forwarded. The routing table reflects the overall topology of the entire network as known to the router 10. The system controller 12 communicates with neighboring routers in the network to exchange topology-related information so that the routing tables are kept current despite changes in the network topology. Thus for example when a new node is configured on a network segment, that information is broadcast throughout the network to enable each router to update its routing table.

As mentioned, the device 10 uses the information in the routing table to make decisions regarding how to forward a packet. In a manner described in greater detail below, the device 10 arranges the information in the routing table, and distributes the information among the cards 14, 16 in such a manner that routing decisions take the form of lookups in the cards 14 and 16. The system controller 12 is not involved on a lookup-by-lookup basis, but rather continually updates and distributes routing information to enable each card 14 and 16 to perform lookups independently. The lookups are done at a very high rate, so the device 10 efficiently supports a large number of customers having high data rate demands. As part of its routing-related operation, the system controller 12 determines when it is necessary to update the routing information on the cards 14 and 16, and re-generates and broadcasts the information to the cards. The information is broadcast in a manner that does not interfere with the lookup operations on the cards 14 and 16.

The configuration shown in FIG. 1 is intended to be representative. In alternative embodiments there may be different numbers of customer interface cards 14 and/or core interface cards 16. Also, the cards may operate according to other protocols. In some embodiments the separate functional elements shown in FIG. 1 may be physically arranged in other manners, such as for example on a single circuit board.

Figure 2:
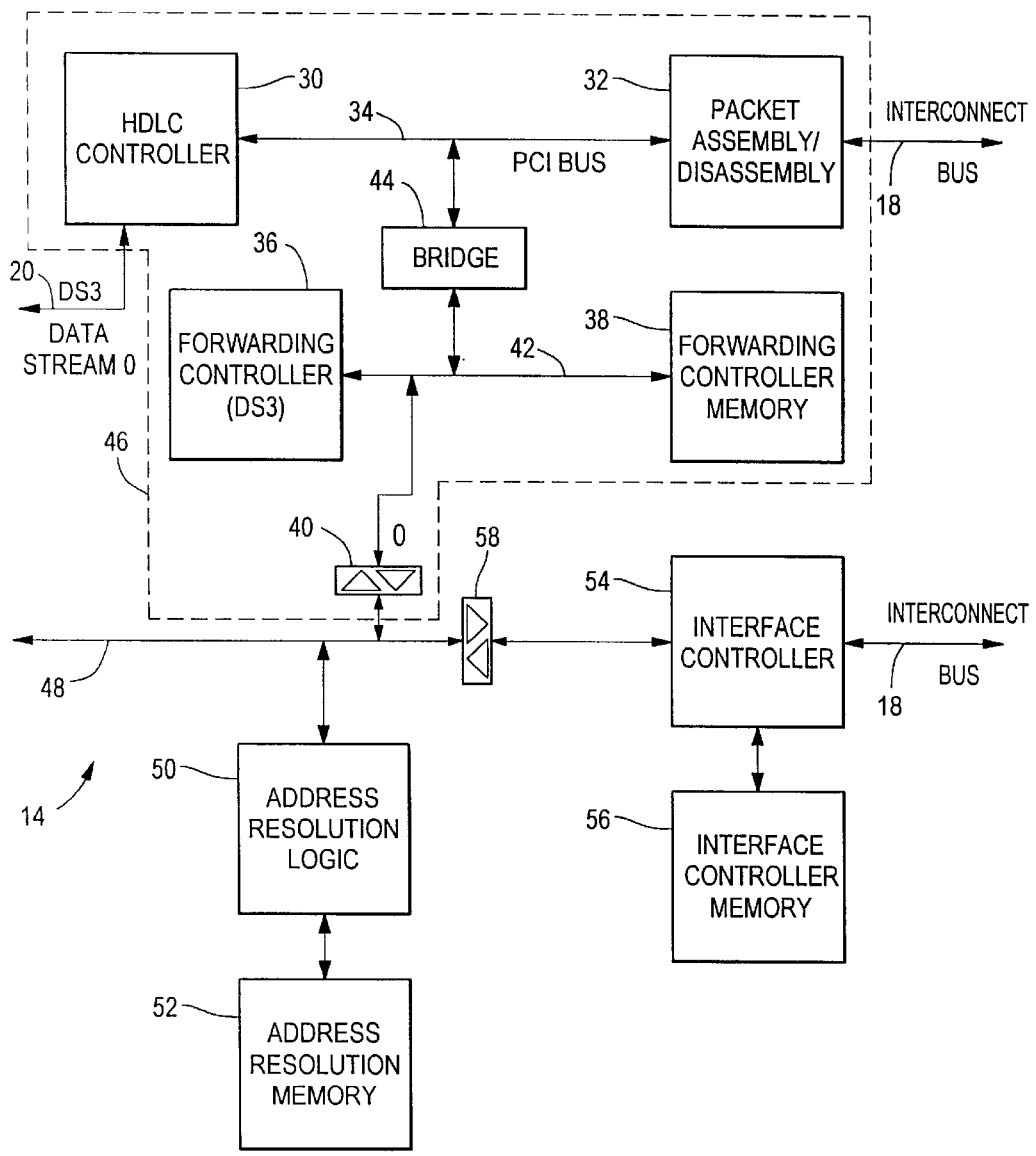
FIG. 2 is a block diagram of a customer interface line card in the network router device of FIG. 1.

FIG. 2 shows the structure of a DS3 card 14. A High-level Data Link Control (HDLC) controller 30 transmits and receives a DS3 data stream (such as DS3 stream 0 as shown) to and from a customer segment 20 as HDLC frames. The HDLC controller 30 interfaces to packet assembly and disassembly logic 32 via a bus 34. The DS3 card 14 also contains a DS3 forwarding controller 36, which along with forwarding controller memory 38 and bus transceivers 40 is attached to a bus 42. A bridge circuit 44 provides a communications path between devices on the bus 34 and devices on the bus 42. The foregoing devices are part of a logical interface unit 46 associated with one DS3 data stream, in this case stream 0 as indicated. The card 14 contains three such units 46 to interface to the three DS3 customer network segments 20 of FIG. 1.

The transceivers 40 within each interface unit 46 are connected to another bus 48 that provides communication to address resolution logic 50, which in turn interfaces with address resolution memory 52. An interface controller 54 has associated interface controller memory 56 and communicates with the bus 48 via transceivers 58.

Figure 3:
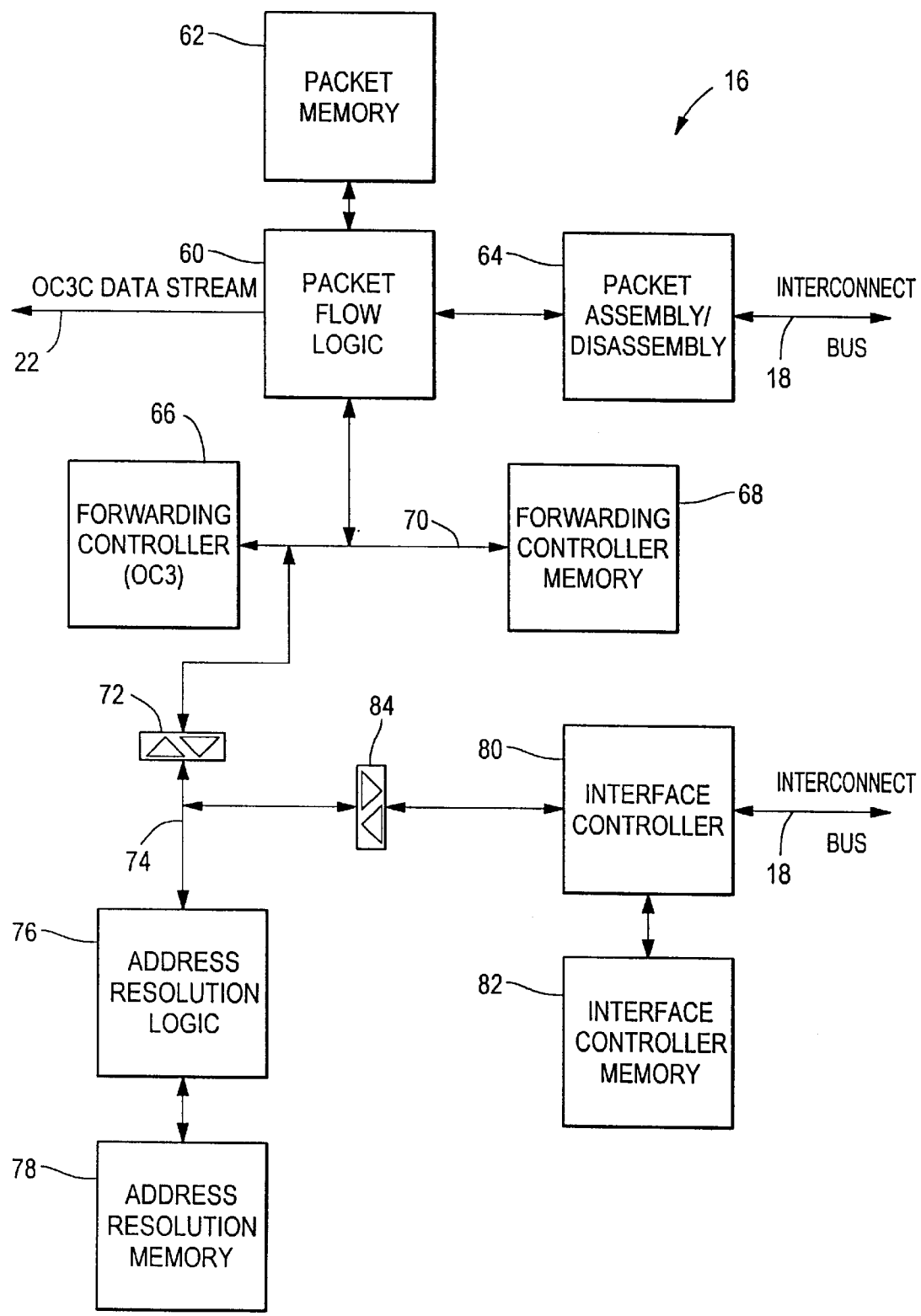
FIG. 3 is a block diagram of an interface line card for a core network in the router of FIG. 1.

FIG. 3 shows the structure of the OC3 card 16. Packet flow logic 60 transmits and receives the OC3 data stream to and from the core network segment 22. The OC3 data is buffered within a packet memory 62. The packet flow logic 60 interfaces with packet assembly and disassembly logic 64 tied to the interconnect bus 18 of FIG. 1. The packet flow logic 60 also interfaces with an OC3 forwarding controller 66 and associated forwarding controller memory 68 via a bus 70. Transceivers 72 are connected between the bus 70 and another bus 74 that provides communication to address resolution logic 76, which in turn interfaces with address resolution memory 78. The address resolution logic 76 and address resolution memory 78 are structurally the same as their counterparts 50 and 52 in FIG. 2, but function somewhat differently as described below. The OC3 card 16 also contains an interface controller 80 and associated interface controller memory 82; the interface controller 80 communicates with the bus 74 via transceivers 84.

Figure 4:
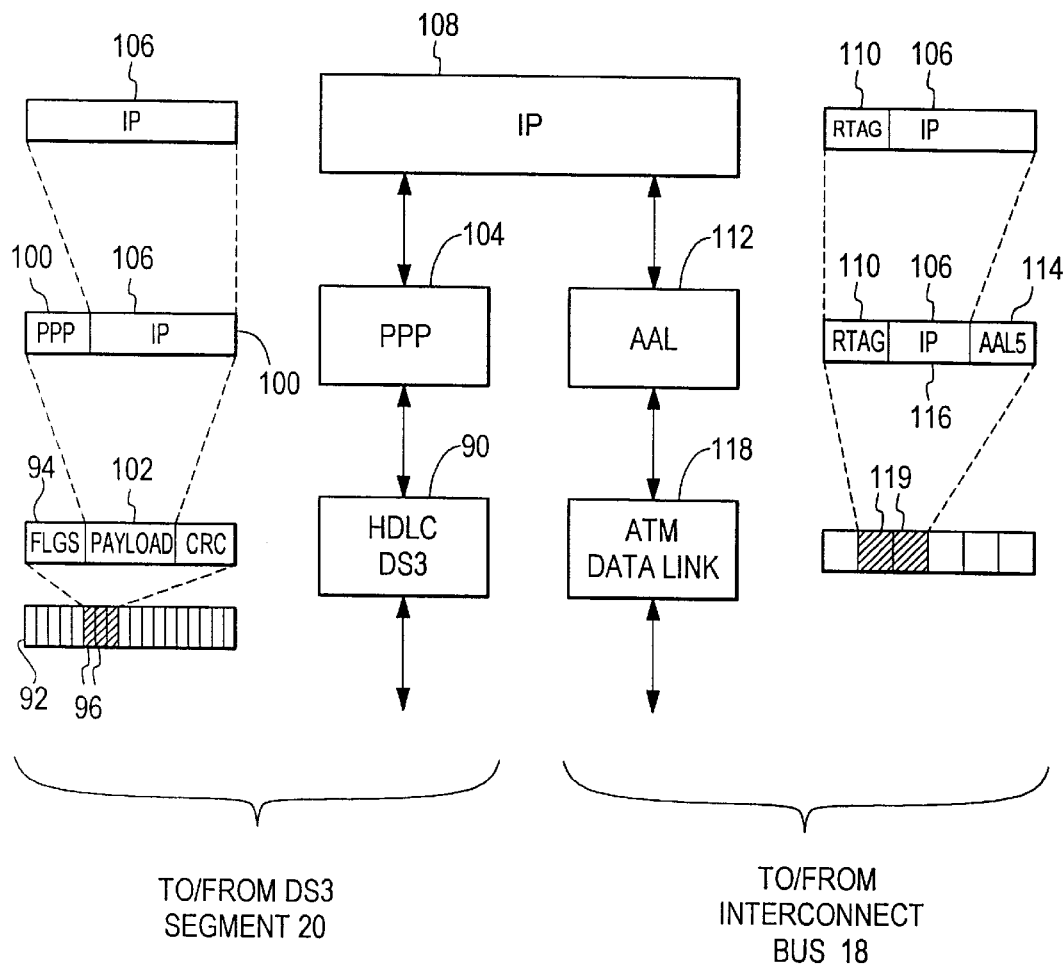
FIG. 4 is a schematic diagram depicting how data received from a network is processed within the customer interface line card of FIG. 2.

FIG. 4 illustrates the processing of network data traffic on the DS3 cards 14. Processing is performed hierarchically, with protocol stacks being employed at the interfaces to the DS3 network segments 20 and at the interface to the internal interconnect bus 18. At the interface to a DS3 network segment 20, HDLC and DS3 logic 90 transmits and receives DS3 frames 92. The HDLC and DS3 logic 90 is part of the HDLC controller 30 of FIG. 2. HDLC and DS3 logic 90 converts received DS3 frames 92 to HDLC frames 94, and also converts outgoing HDLC frames 94 to DS3 frames 92 for transmission on the DS3 segment 20. As shown in FIG. 4, the DS3 frames 92 include multiple DS0 channels 96. The logic 90 is programmed by interface controller 54 to associate groups of DS0 channels 96. On the receive side, the logic 90 forms HDLC frames 94 from each group of associated channels 96. On the transmit side, the logic 90 breaks HDLC frames 94 down into multiple DS0 channels for transmission on the DS3 segment 20.

The HDLC and DS3 logic 90 also creates PPP frames 100 from received HDLC frames 94, and converts outgoing PPP frames 100 to HDLC frames 94 for transmission on the DS3 segment 20. Each PPP frame 100 corresponds to a payload portion 102 of an HDLC frame 94.

PPP logic 104 extracts IP frames or packets 106 from received PPP frames 100, and provides the IP frames 106 to IP logic 108. The PPP logic 104 also creates outgoing PPP frames 100 for IP frames 106 to be transmitted over the DS3 segment 20. The IP logic 108 carries out a variety of network-level tasks, such as frame forwarding or routing, frame classification for Quality of Service (QOS) support, and statistics gathering for network management purposes. The frame forwarding function is performed partially by the IP logic 108 and partially by similar IP logic on the OC3 card 16. For IP frames received from a DS3 segment 20 destined for the OC3 segment 22, the IP logic 108 performs "ingress"

processing while the IP logic on the OC3 card 16 performs "egress" processing. For IP frames travelling in the other direction, the IP logic on the OC3 card 16 performs ingress processing while the IP logic 108 performs egress processing. In either case the ingress IP logic appends a route tag 110 to the IP frame 106 for use by the egress IP logic in a manner described below.

The interconnect bus 18 of FIG. 1 employs the ATM data link protocol for transferring data among the various cards 14 and 16 in the system 10. Thus to communicate internally the IP logic 108 interfaces with ATM adaptation layer (AAL) logic 112 that implements the ATM Adaptation Layer 5 (AAL5) protocol to effect the transfer of frames 116 across the interconnect bus 18. As shown, the frames 116 include the embedded IP frame 106, the route tag 110, and an AAL5 trailer 114. The AAL logic 112 interfaces with ATM data link logic 118 that transfers each frame 116 as a plurality of ATM cells 119 over the interconnection bus 18.

The PPP logic 104, IP logic 108, and AAL logic 112 and ATM data link logic 118 are distributed among several components shown in FIG. 2, including the forwarding controller 36, forwarding controller memory 38, packet assembly and disassembly logic 32, address resolution logic 50 and address resolution memory 52. The operation of these components is described in more detail below.

Figure 5:
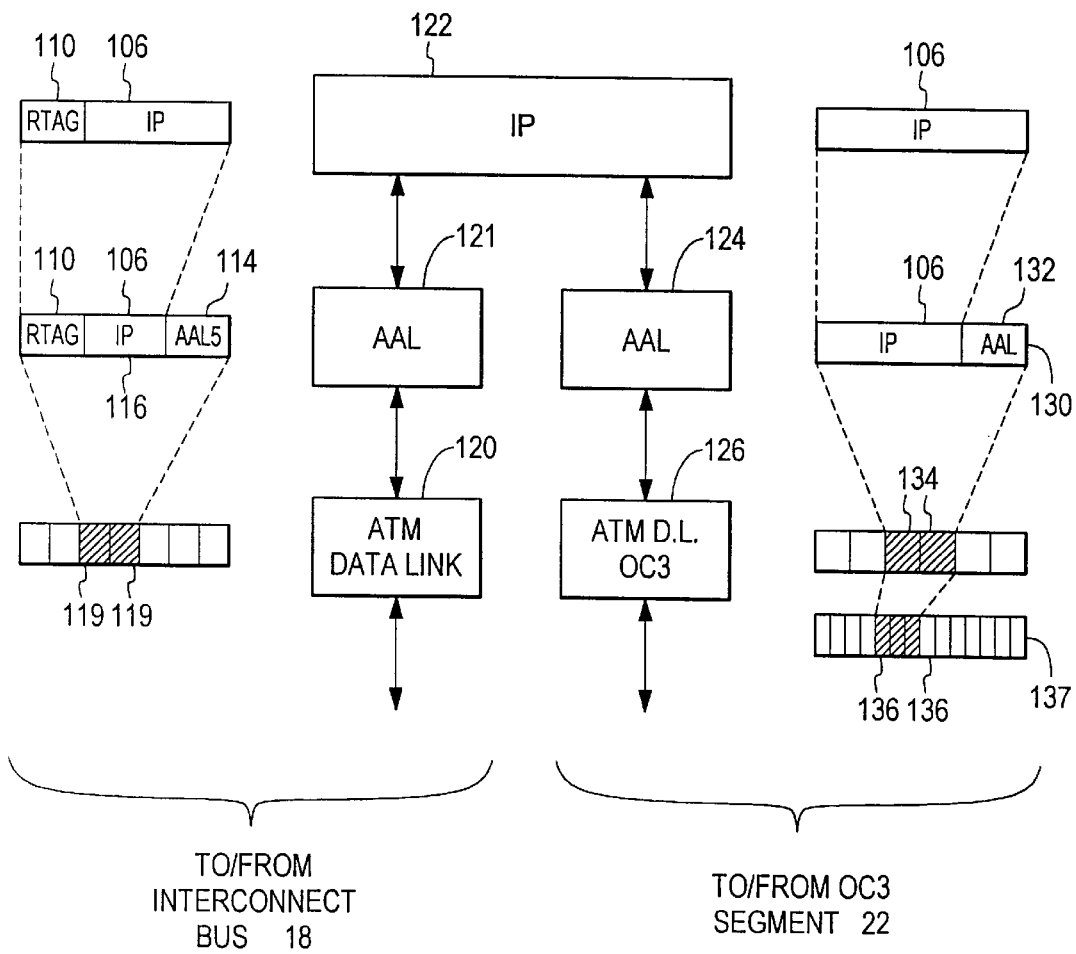
FIG. 5 is a schematic diagram depicting how data received from a network is processed within the core network interface line card of FIG. 3.

FIG. 5 shows frame processing on the OC3 card 16. The transfer of frames to and from the interconnect bus 18 is carried out by ATM data link logic 120 and AAL interface logic 121. The AAL logic 121 interfaces with IP logic 122, which is the counterpart of the IP logic 108 on the DS3 cards 14. AAL logic 124 along with ATM data link and OC3 logic 126 carry out the interface between the IP logic 122 and the OC3 segment 22. As shown, the AAL logic 124 communicates over the OC3 segment 22 using frames 130 having the embedded IP frame 106 and an AAL trailer 132. The ATM data link and OC3 logic 126 transfer the frames 130 as a plurality of ATM cells 134 at the data link layer. The ATM cells are transported at the physical layer in channels 136 within frames 137 appearing on the OC3 segment 22.

The ATM data link logic 120, AAL logic 121, IP logic 122, and ATM circuit logic 124 are implemented primarily by the OC3 forwarding controller 66, forwarding controller memory 68, address resolution logic 76 and address resolution memory 78 of FIG. 3. The ATM data link and OC3 logic 126 is implemented primarily by the packet flow logic 60, packet memory 62, and packet assembly and disassembly logic 64 of FIG. 3.

Figure 6:
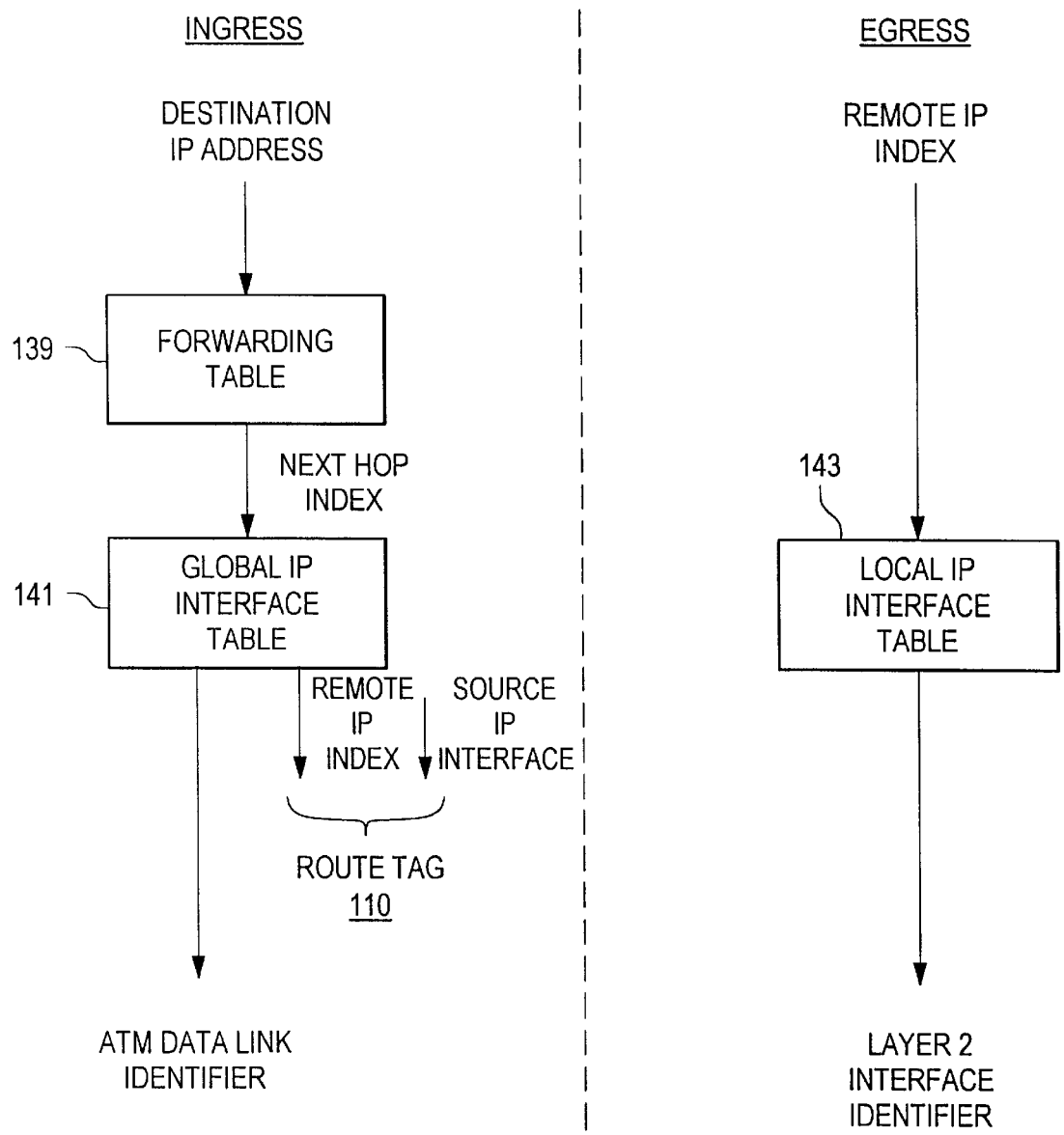
FIG. 6 is a schematic diagram depicting how forwarding addresses are obtained based on the destination addresses appearing in packets received by the network router device of FIG. 1.

FIG. 6 illustrates the overall processing by the network device 10 of an IP destination address to direct a received frame to the desired next hop node. The destination address is used to lookup a next hop index in a forwarding table 139 residing in the address resolution memory 52 or 78 of an ingress line card 14 or 16. The next hop index is used to retrieve an entry from a global IP interface table 141, each entry of which represents one of several hundred IP interfaces known to the network device 10. The global IP interface table 141 supplies an ATM data link identifier and a remote IP index, both these values being associated with the IP interface represented by the looked-up entry. The ATM data link identifier identifies an ATM data link logic block 120 within the network device 10 to which the IP frame should be forwarded within the box. The remote IP index is used along with a source IP interface identifier (identifying the interface on which the IP frame was received) to form the route tag 110. As previously described, the route tag 110 is appended to the received IP frame and transferred to the egress-side IP logic by the ingress-side IP logic.

As shown in FIG. 6, on the egress side the remote IP index from the route tag 110 is used to retrieve an entry from a local IP interface table 143. This entry contains an identifier of a layer-2 interface on which the IP frame should be forwarded. The identifier is the next hop "address". In the illustrated embodiment, the layer-2 interface identifier from the local IP interface table 143 identifies an ATM connection by VPI and VCI value. In alternative embodiments this identifier may take other forms, however. For example, in an embodiment in which the egress side interface is an Ethernet interface, the layer-2 identifier is a MAC address of an Ethernet node to which the IP frame should be forwarded. The MAC address is retrieved from a table used to stored address bindings in accordance with the Address Resolution Protocol (ARP).

It should be noted at this point that the lookup technique described herein may be used to support operational features of the network device 10 other than routing. The index retrieved from the forwarding table 139 may identify a list of alternative routes rather than a single route. This feature is referred to as "equal-cost multipath". The index may identify specific Quality of Service (QOS) processing to be performed based on an address such as a source address contained within a received packet. The global IP interface table 141 may be thought of as a specific type of global forwarding equivalence class table containing information about how a received packet is to be processed.

Figure 7:
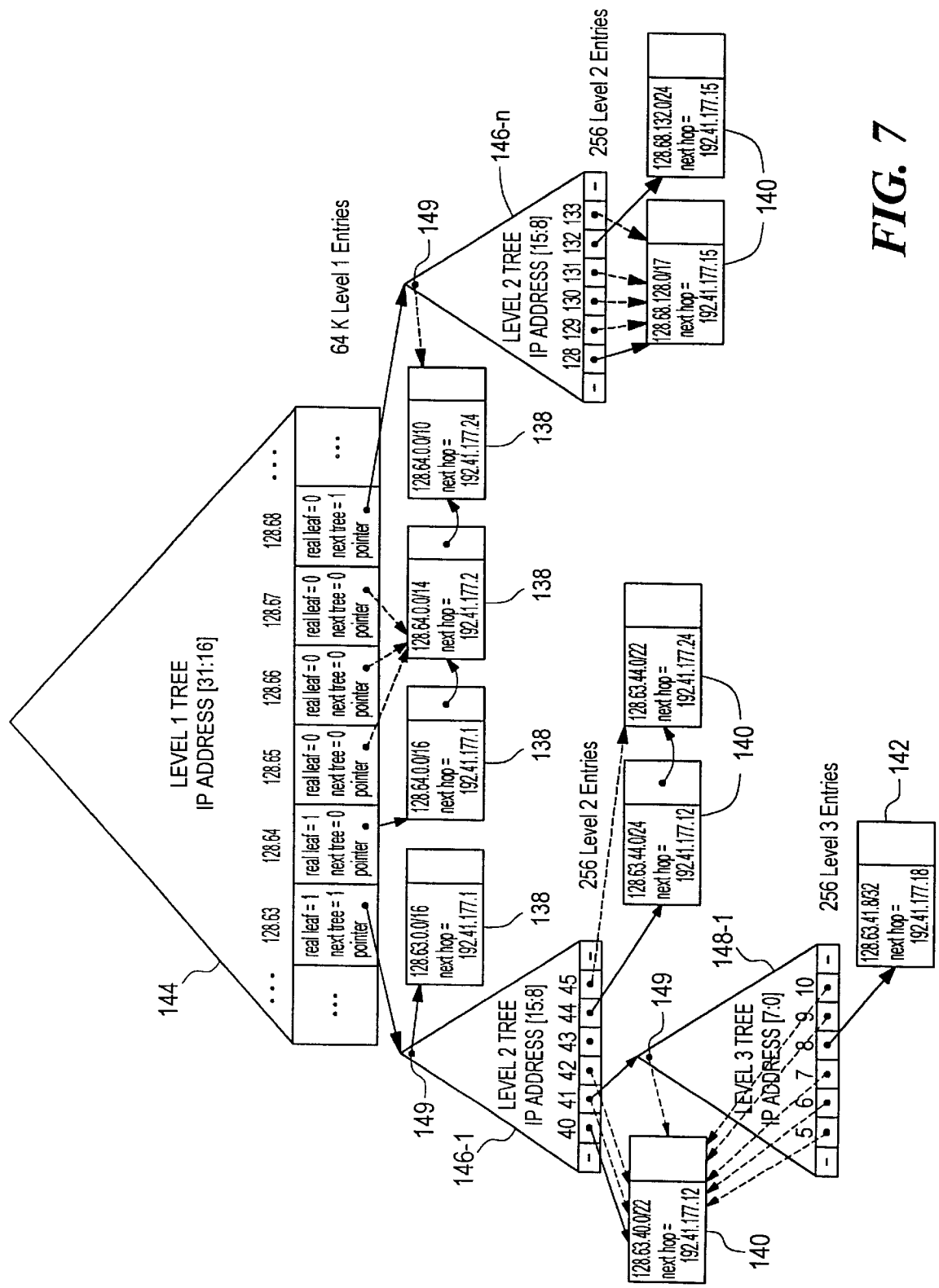
FIG. 7 is a schematic diagram of an uncompressed tree data structure representation of a routing table in a system controller in the network router device of FIG. 1.

FIG. 7 illustrates the structure of a routing table maintained by the system controller 12 of FIG. 1 for routing purposes. The overall structure shown in FIG. 7 is referred to herein as an "uncompressed tree", as distinguished from "compressed trees" which are described below.

The routing table contains a plurality of routing entries, segregated into groups as follows: level-1 routing entries 138 which have subnet mask lengths of 16 or less; level-2 routing entries 140 having subnet mask lengths of between 17 and 24; and level-3 routing entries 142 having subnet mask lengths of between 25 and 32.

Each routing entry 138, 140 and 142 includes a key and a "next hop" address. The key includes a destination IP address value and a subnet mask value (shown together in the form X.X.X.X/yy at the top of each routing entry). The next hop address is an IP address (shown in the form X.X.X.X at the bottom of each routing entry) which is the address of a network to which frames having destination addresses matching the key should be forwarded.

Beyond the coarse division of routing entries into levels 1, 2 and 3, the routing entries are further organized according to their key address values and subnet mask lengths. When multiple routing entries have the same key address value, these are grouped into a linked list. Each linked list is sorted in order of descending subnet mask length, which is also the order of decreasing specificity.

Sub-trees at the three different levels index into the routing entries 138, 140 and 142. A single tree 144 at level 1 contains pointers to level-1 routing entries 138. The level-1 tree 144 includes $2^{16}$ or 64K pointer storage locations indexed by IP address bits [31:16], the most significant 16 bits of the IP address. A portion of the level 1 tree 140 is shown in FIG. 7, including locations 128.63 through 128.68. Multiple trees 146 at level 2 contain pointers to level-2 routing entries 140. Each level-2 tree 146 includes $2^8$ or 256 pointer storage locations indexed by IP address bits [15:8]. Similarly, multiple trees 148 at level 3 contain pointers to level-3 routing entries 142. Each level-3 tree 148 includes $2^8$ or 256 pointer storage locations indexed by IP address bits [7:0].

Each pointer storage location in the level-1 tree 144 contains either a pointer or a null value indicating that the location is empty. In addition, each location contains additional bits that describe the pointer type when a pointer is present. Each pointer points to a corresponding routing entry and each routing entry may be part of a linked list of routing entries as described above. A pointer may point to a routing entry whose key address value is equal to the index of the location at which the pointer is stored. Such pointers are termed "real leaf" pointers, and this status is indicated by a bit called the "real leaf" bit being set to one. A pointer may instead point to a routing entry whose key address value is not equal to the index of the pointer, but is the best match for that index based on the subnet mask. These pointers are termed "fill leaf" pointers, as indicated by the "real leaf" bit being set to zero. In FIG. 7, the path between a fill pointer and the associated routing entry is shown using a dotted line.

An additional bit called the "next tree" bit is used to indicate whether the pointer is a "next tree" pointer pointing to a level-2 tree 146. A next tree pointer is stored in the level-1 tree 140 when more than the upper 16 IP address bits must be examined to determine the next hop. This condition is indicated by the presence of either a level-2 routing entry 140 or a level-3 routing entry 142 whose upper 16 IP address bits are equal to the address of the next tree pointer. The next tree pointer is the address of a level-2 tree 146 used to decode IP address bits [15:8]. Thus whenever a next tree pointer is retrieved from the level-1 tree 144 during a lookup, a second lookup to a level-2 tree 146 must occur.

A mechanism is provided for identifying both a routing entry and a next tree at a given pointer location in the level-1 tree 144. In the illustrated embodiment this is achieved by providing a special pointer 149 associated with the root of each level-2 tree 146. The pointer in the level-1 tree 144 points to a level-2 tree 146, and the pointer 149 points to a level-1 routing entry 138. It should be noted that there are alternative ways to achieve the required association between an entry in the level-1 tree and both a level-1 routing entry 138 and a level-2 tree 146. For example, both pointers could be stored in the level-1 entry, or each routing entry 138 could optionally point to a level-2 tree 146 when necessary. However, the illustrated approach has the advantage of storage efficiency, because space for a second pointer is needed only when a pointer in the level-1 tree 144 points to a level-2 tree 146.

Each level-2 tree 146 contains 256 storage locations containing either null or pointer values. Like the level-1 tree 144, each pointer can point to either a next tree or directly to a routing entry, and routing entry pointers may be either "real leaf" or "fill leaf" pointers. Next tree pointers are used in a level-2 tree 146 when it is necessary to examine more than the upper 24 IP address bits to determine the next hop. The next tree pointer is the address of a level-3 tree 148 used to decode IP address bits [7:0]. Special pointers 149 are used in the level-3 trees 148 to point to level-2 routing entries 140, in a manner analogous to that described above for level-2 trees 146 and level-1 routing entries 138.

Each level-3 tree 148 also contains 256 storage locations containing either null or pointer values. The leaf pointers in the level-3 trees 148 may be either real or fill pointers in a manner analogous to the level-1 and level-2 trees 144 and 146. There are no next tree pointers in the level-3 trees 148, because in the illustrated embodiment there are no further levels of decoding the IP address.

The information in the uncompressed tree shown in FIG. 7 is maintained in the following manner. The system controller 12 of FIG. 1 adds and deletes routing entries in accordance with the routing protocol. When a routing entry is added, it is first determined whether a new level-3 tree 148 and/or a level-2 tree 146 must be created for the routing entry. This depends on the subnet mask length and whether or not a level-3 or level-2 tree already exists for other routing entries having key addresses that match the key address of the new routing entry in the corresponding fields. If no such tree or trees exist, then new level-3 and/or level-2 trees are created for the new routing entry. A next tree pointer for each new tree is placed in the next-higher level tree. Special pointers 149 are placed in the new trees if there are routing entries associated with the locations of the new next tree pointers.

After any required new trees have been created, the location in the tree corresponding to the key of the new routing entry is examined. This may be a location in the level-1 tree 144, a level-2 tree 146, or a level-3 tree 148, depending on the subnet mask length. If the location is empty or contains a fill pointer, then a new real leaf pointer to the new routing entry is placed in the location. If the location already contains a real leaf pointer, then the new routing entry is inserted into the linked list to which the real leaf pointer points. The routing entry is inserted in a manner that maintains ordering according to decreasing subnet mask length.

Once a real leaf pointer has been added for the new routing entry, then all of the tree locations in the range of IP addresses covered by the new routing entry are examined. Fill pointers are placed in those locations for which the new routing entry is the best match, based on the subnet mask length. This process must be done in the level-1 tree 144 as well as any level-2 trees 146 or level-3 trees 148 that are in the address range covered by the new routing entry. In some cases, fill pointers may point from one level to a higher level in the tree. An example is shown in FIG. 7, in which several pointers in the level-3 tree 148-1 are pointing to the level-2 routing entry whose key is 128.63.40.0/22.

When a routing entry is deleted, the entry is removed from the linked list in which it resides, if any. If as a result of the deletion there are no longer any routing entries in the linked list, then the real leaf pointer in the tree is replaced with a fill pointer pointing to a next best remaining match, if one exists, or is deleted. Then all of the tree locations in the range of IP addresses covered by the deleted routing entry are examined. For those locations having a fill pointer to the deleted routing entry, the fill pointer is either changed to point to a next best remaining match, if one exists, or is deleted.

For example, if the routing entry 128.64.0.0/14 were deleted from the routing table of FIG. 7, the fill pointers at locations 128.65, 128.66 and 128.67 would be changed to point to the routing entry 128.64.0.0/10. If the routing entry 128.64.0.0/10 were deleted, then all of the pointers in locations 128.68 through 128.127 would be deleted. The level-2 and level-3 trees in the covered address range are also examined, and fill pointers are appropriately modified.

A level-3 tree 148 is deleted when it no longer contains any real leaf pointers, and a level-2 tree is deleted when it no longer contains any real leaf pointers or next tree pointers. When a tree is deleted, the pointers in the remaining higher level(s) are modified as necessary. For example, if the level-2 tree 146-n were deleted, the pointer at location 128.68 in the level-1 tree 144 would be modified to point directly to the entry 128.64.0.0/10, and the "next tree" bit would be set to zero.

Figure 8:
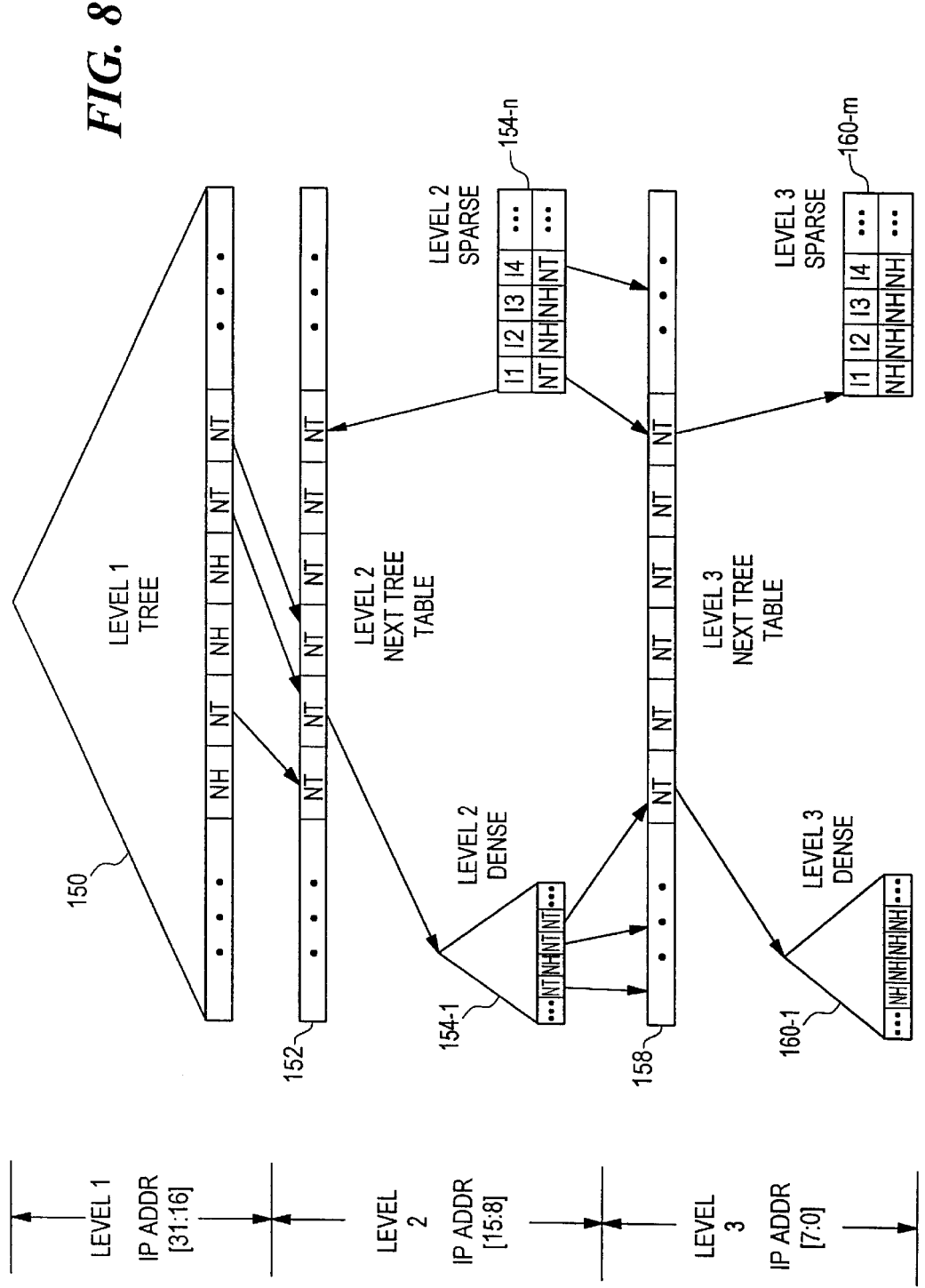
FIG. 8 is a schematic diagram of a compressed tree data structure representation of a forwarding table in the line cards of FIGS. 2 and 3.

FIG. 8 shows the structure of the forwarding table 139 of FIG. 6, which is used on each interface card 14 and 16 of FIG. 1. The forwarding table 139 is stored in the address resolution memory 52 on the DS3 card 14 of FIG. 2, and in the address resolution memory 78 on the OC3 card 16 of FIG. 3. The information in the forwarding table 139 of FIG. 8 is derived from the uncompressed tree routing table of FIG. 7 in a manner described below. The forwarding table 139 includes tree structures, and is generally smaller in size than the uncompressed tree structure of FIG. 7. For this reason the forwarding table 139 is referred to as a "compressed tree" forwarding table.

Like the uncompressed tree, the compressed tree is divided into three levels associated with IP address bits [31:16], [15:8] and [7:0] respectively. At level 1, a single tree 150 has 64K 16-bit entries. One bit of each entry is a type bit, and the remaining 15 bits form a pointer value. The pointer value for empty entries is a null value. For non-empty entries, the type bit indicates whether the pointer is a "next hop" pointer NH or a "next tree" pointer NT.

Each next hop pointer NH contains an address of an entry in the global IP interface table 141 of FIG. 6. As described above, the entries retrieved from the global IP interface table 141 are used to form the route tags 110, which in turn are used to obtain the identities of the interfaces on which received IP frames are to be forwarded to reach the desired next hop nodes. As discussed above, in alternative embodiments the pointer retrieved from the compressed tree may provide an index into another type of table to indicate other types of processing to be performed, such as QOS processing.

Each next tree pointer NT contains an index into a level-2 next tree table 152. Each entry in the level-2 next tree table 152 contains a 24-bit pointer field and an 8-bit size field. The 24-bit pointer field contains an NT pointer pointing to a level-2 compressed tree 154. Each level-2 compressed trees 154 may be either a "dense" tree holding 256 pointer entries, or a "sparse" tree holding 32 or fewer entries. The 8-bit size field indicates how many NH or NT pointers are stored in the level-2 compressed tree. The size information is used in a manner described below to retrieve pointers from the level-2 compressed trees 154.

The use of the level-2 next-tree table 152 including 24-bit NT pointers provides for a level of indirection in the accessing of level-2 compressed trees. While this indirection entails additional delay, it provides desired flexibility in the allocation of storage space within the address resolution memories 52 and 78 of FIGS. 2 and 3, as described in greater detail below.

When more than 32 next hop or next tree pointers are stored in the level-2 tree, these pointers are stored in a "dense" level-2 compressed tree 154. Each dense level-2 compressed tree 154 contains 256 16-bit entries, and each non-null entry includes a type bit and a 15-bit NH/NT pointer as in the level-1 tree 150. The entries in the dense level-2 trees 154 are retrieved by a straight decoding of IP address bits [15:8].

When 32 or fewer next hop or next tree pointers are stored in the level-2 tree, these pointers are stored in a "sparse" level-2 compressed tree 154 to conserve storage space. Each sparse level-2 tree 154 contains from 4 to 32 locations in increments of 4. Each non-null entry contains a type bit, a 15-bit NH/NT pointer, and an index tag indicating the highest value of IP address bits [15:8] for which the NT/NH pointer should be used. The entries are stored in ascending order of index tags. During a next-hop lookup, the index tags of the entries are searched in a manner described below in order to retrieve the correct NT/NH pointer based on the destination IP address of the received frame.

The NT pointers in the level-2 trees 154 point to entries in a level-3 next tree table 158 which is analogous to the level-2 next tree table 152. The NT pointers in the level-3 next tree table 158 point to level-3 compressed trees 160, which may be either dense or sparse. These trees are analogous to their level-2 counterparts 154, except that all non-null pointers in the level-3 compressed trees 160 are NH pointers, so there is no need of a type bit.

In the compressed tree structure of FIG. 8, it is possible to achieve even greater storage efficiency by taking advantage of certain partitioning of the IP address space. For example, there is a known multicast address space at IP address 224.0.0.0 and so-called "class E" address space above the multicast space. It is not necessary to allocate space in the level-1 tree 150 for these addresses, so it may be possible to reduce the size of the level-1 tree 150.

Figure 9:
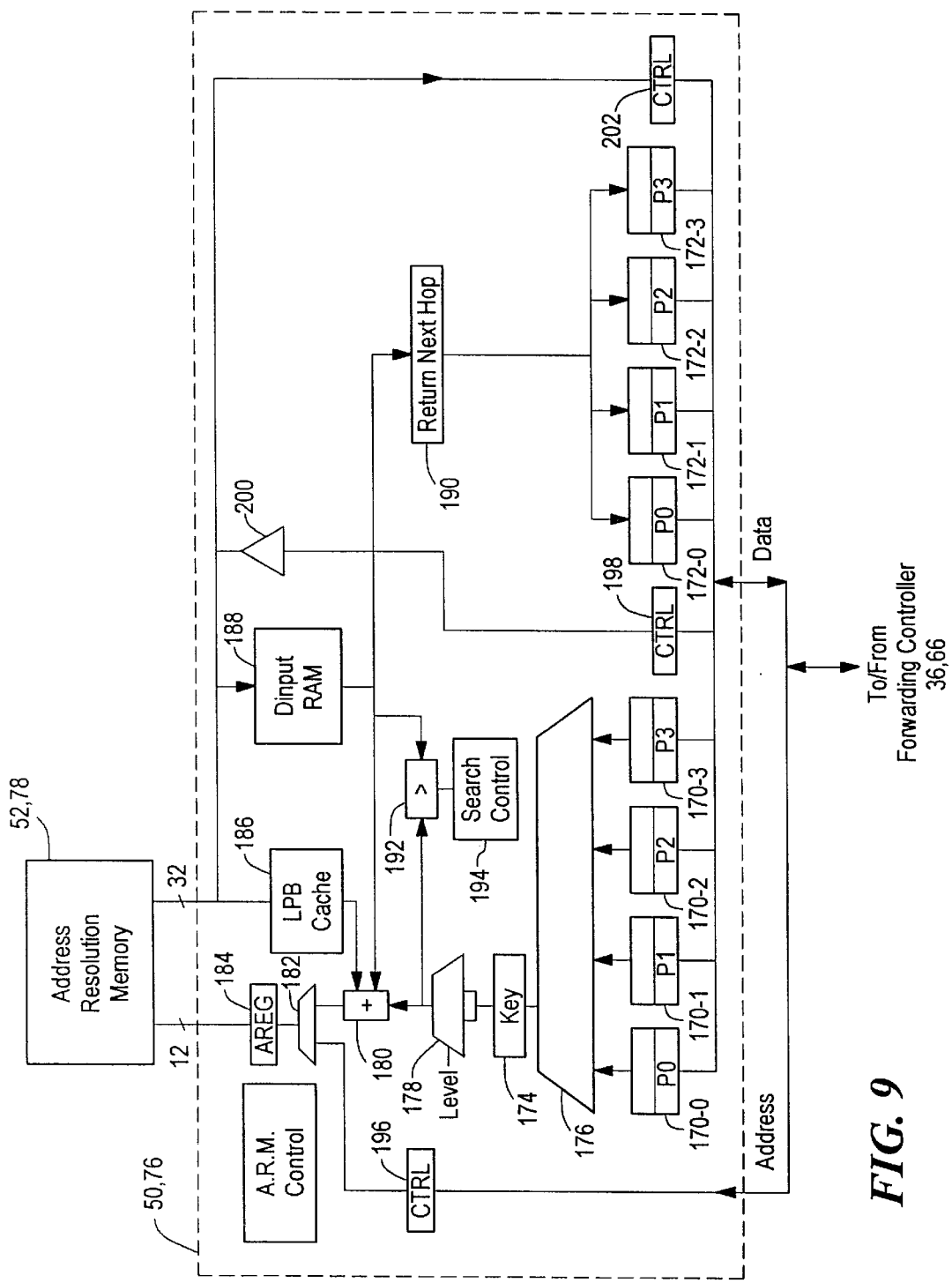
FIG. 9 is a block diagram of address resolution logic and an address resolution memory in the line cards of FIGS. 2 and 3.

FIG. 9 shows the structure of the address resolution logic 50, 76 and the address resolution memories 52, 78 of FIGS. 2 and 3. Each address resolution logic block 50, 76 includes four ports P0 through P3. For each port there is a corresponding input FIFO 170 and output FIFO 172. The forwarding controllers 36 and 66 of FIGS. 2 and 3 write 32-bit destination IP addresses into the port input FIFOs 170 to initiate next hop lookups. The next hop index is returned in the corresponding output FIFO 172. There can be multiple lookups pending at a given time in the address resolution logic 50, 76, although each lookup is an atomic sequence that is performed to completion once begun. Lookup requests from the different ports P0 through P3 are arbitrated in a round-robin manner, and a lookup requested at a given port is performed only if there is sufficient room for the result to be stored in the output FIFO 172 for that port.

The destination IP address from a given input FIFO 170 is transferred to a key register 174 via a port multiplexer 176. A level multiplexer 178 is used to select the bits of the IP address based on the level at which the lookup is being conducted:

| Level      | 1       | 2      | 3     |
|------------|---------|--------|-------|
| IP Address | [31:16] | [15:8] | [7:0] |

The output from the level multiplexer 178 is provided to an adder 180 used to form a 24-bit address used to address the associated address resolution memory 52 or 78. This address passes through an address multiplexer 182 to a memory address register 184 connected to the address inputs of the associated memory 52 or 78.

The output from the address resolution memory 52 or 78 is provided to a small cache of level/base pointers 186 whose use is described below, and also to a small input buffer RAM 188. The output of the RAM 188 is provided to the adder 180 and to a return next hop register 190 which feeds the output FIFOs 172. The output of the RAM 188 is also provided along with the output of the level multiplexer 178 to compare logic 192, which is used by search control logic 194 to carry out searching at levels 2 and 3.

The address resolution logic 50, 76 also contains elements to enable an external device to directly read and write the address resolution memory 52, 78. This feature is used by the interface controllers 54 and 80 of FIGS. 2 and 3 to store updated compressed trees into the address resolution memories 52, 78 when they are received from the system controller 12 of FIG. 1. The elements that support this feature are an input address register 196, an input data register 198 and tri-state buffers 200, and an output register 202. The storing of updated compressed trees can be performed at the same time that searches are in progress, so that search bandwidth is not compromised by the need to update the compressed trees.

While as illustrated the address resolution logic 50, 76 contains a single search controller 194, in alternative embodiments it may be desirable to include multiple search controllers to achieve greater parallelism and thus higher lookup rates. Another alternative is to use multiple address resolution memories and associated lookup logic to achieve even greater parallelism.

Figure 10:
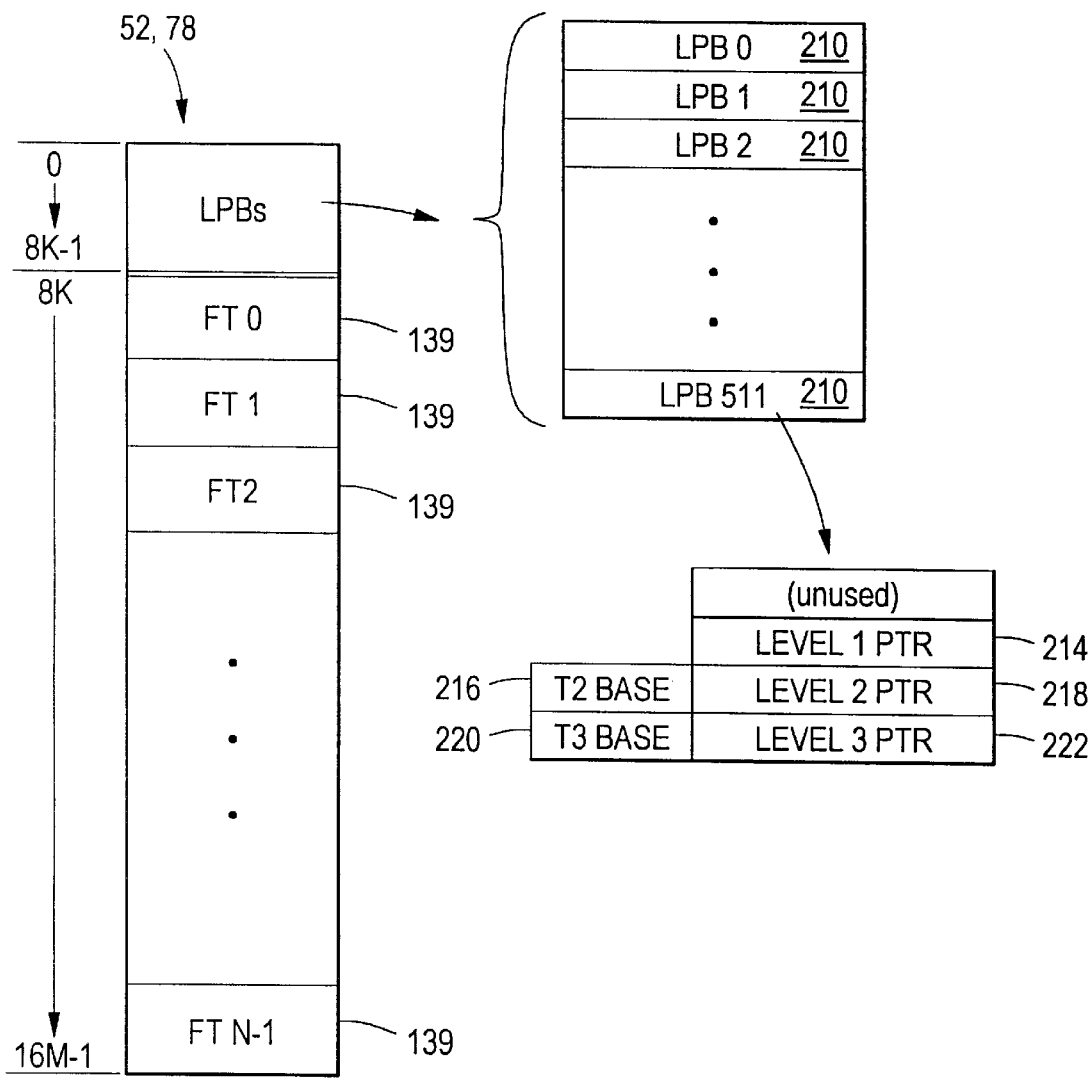
FIG. 10 is a memory map of the address resolution memory of FIG. 9 showing how multiple compressed tree data structures like the compressed tree data structure of FIG. 8 are stored therein.

FIG. 10 shows a memory map of the address resolution memories 52, 78. The first 8 Kb are used to store up to 512 16-byte level pointer blocks 210. The remainder of the 16 Mb storage space is allocated to storing compressed forwarding tables 139, each forwarding table 139 being associated with a corresponding one of the 512 level pointer blocks 210. Each level pointer block 210 contains the following items used to address the corresponding forwarding table 139: a level 1 pointer 214; a T2 base address 216; a level 2 pointer 218; a T3 base address 220; and a level 3 pointer 222. The use of these items is described below. In alternative embodiments it may be desirable to have more or less address resolution memory 52, 78, and to allocate more or less space for the storage of level pointer blocks 210.

Figure 11:
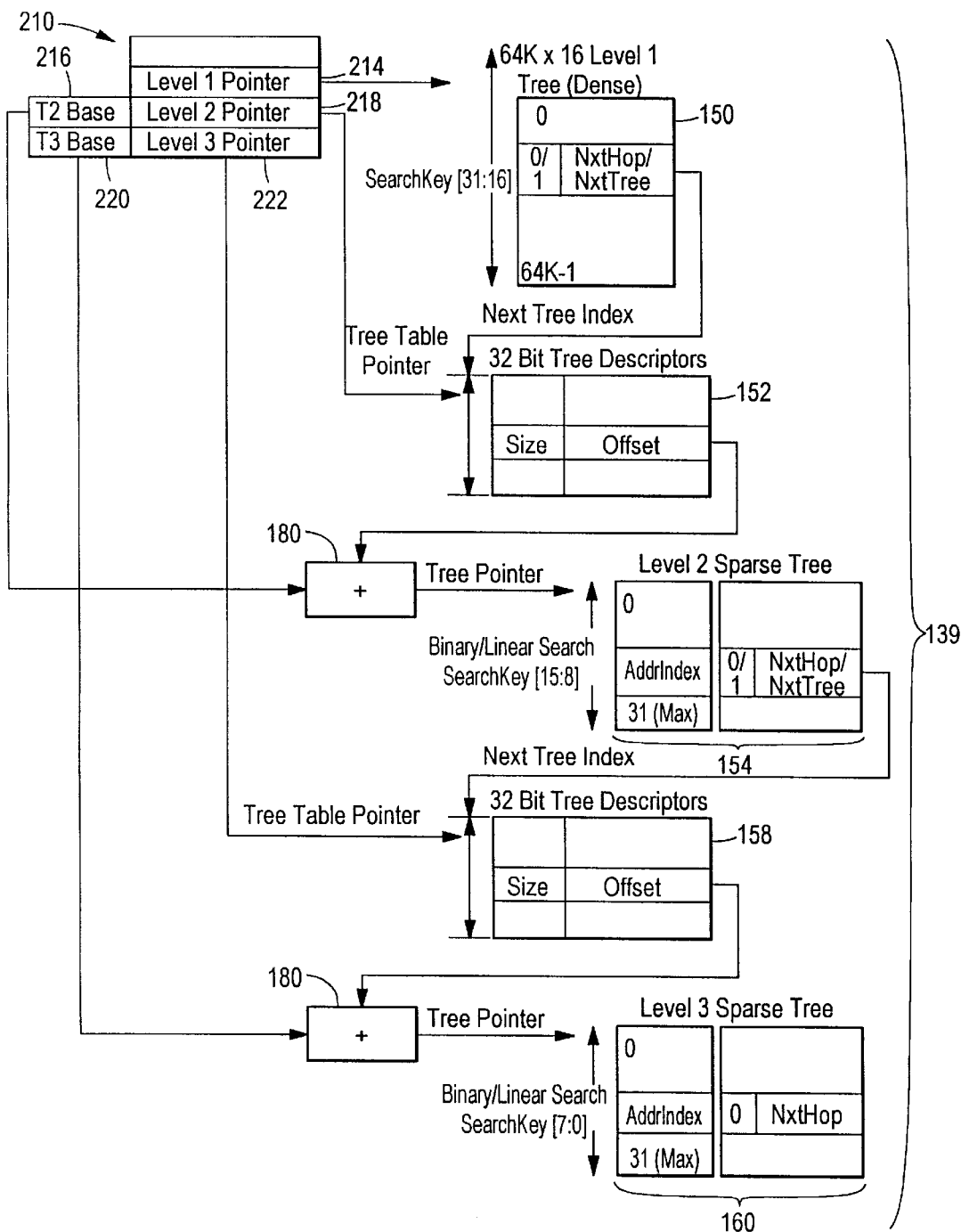
FIG. 11 is a schematic diagram showing the manner in which the compressed tree data structure of FIG. 8 is stored in address resolution memory and is accessed by the address resolution logic of FIG. 9.

FIG. 11 shows the manner in which the pointers in the level/base pointer block 210 are used to access entries in a forwarding table 139 during a next hop lookup. During a lookup, the level pointer block 210 is stored within the level pointer block (LPB) cache 186 of FIG. 9, and the pointers are provided to the adder 180 to calculate addresses of tree entries in the address resolution memory 52 or 78. Upon initiation of a lookup, the level pointer block 210 may already be stored in the LPB cache 186, in which case the lookup proceeds using the stored level pointer block 210. In some cases, the lookup request indicates that the level pointer block 210 should be re-read from the address resolution memory 52, 78 and stored into the LPB cache 186. The level pointer block 210 must be re-loaded, for example, whenever the corresponding forwarding table 139 has been updated by the system controller 12 of FIG. 1, and also when a lookup is being done on a different forwarding table 139 than the forwarding table 139 used for preceding lookups. In each of these cases, the lookup request contains a value indicating which one of the 512 level pointer blocks 210 should be used. The ability to select one of multiple pointer blocks 210 is a feature that enables support for multiple virtual routers. Different ones of the level pointer blocks 210 are allocated for use by different virtual routers, and each virtual router identifies the level pointer block 210 to be used for its route lookups.

At level 1 of the lookup, the level 1 pointer 214 selects the level-1 compressed tree 150 of the forwarding table 139. IP address bits [31:16] provide the index of an entry in the level-1 tree 150. The entry may be an NH pointer, in which case no further searching is required. However, if the entry is an NT pointer then further searching at level 2 is carried out.

At level 2, the NT pointer from the level-1 tree 150 is used as an index into the level-2 next tree table 152 of the forwarding table, the base of which is pointed to by the level 2 pointer 218 from the level pointer block 210. The NT pointer in the level-2 next tree table 152 is added to the T2 base address 216 from the level pointer block 210 to obtain the base address of a level-2 tree 154. The NT pointer points to a level-2 compressed tree 154. If the size is indicated to be greater than 32, then the level-2 tree 154 is a dense tree (not shown in FIG. 11), and IP address bits [15:8] are used to directly look up the level-2 NH/NT pointer. If the size is 32 or fewer, however, then the level-2 tree 154 is a sparse tree, and IP address bits [15:8] are used to conduct a search of the sparse tree 154 in a manner described below.

The entry in the level-2 tree 154 may contain an NH pointer, in which case no further searching is required. However, if the entry contains an NT pointer then further searching at level 3 is carried out. Access to level 3 of the forwarding table proceeds in a manner similar to that of level 2, using the T3 base address 220 and the level 3 pointer 222 from the level pointer block 210, the NT pointer and size retrieved from the level-2 tree 154, and the level-3 next tree table 158 and level-3 trees 160. The search key at level 3 is made up of IP address bits [7:0], and the retrieved pointer is guaranteed to be an NH pointer.

The sparse level-2 trees 154 and level-3 trees 160 are searched in the following manner. If the size of the sparse tree is sixteen or less, then a linear search of the sixteen entries is performed. The RAM 188, comparison logic 192, and search control logic 194 of FIG. 9 are configured to compare the search key to four tree entries simultaneously. As a result, a linear search of sixteen entries requires at most four memory accesses, in the case when it is necessary to examine all sixteen entries. When the tree size is between seventeen and thirty-two entries, the first step performed is comparing the search key to the thirteenth entry. If the search key is less than the thirteenth entry, then a linear search of the first thirteen entries is performed. If the search key is greater than or equal to the thirteenth entry, then a linear search of the thirteenth through thirty-second entries is performed. The first entry having an index greater than or equal to the search key is the desired entry. The pointer from this entry is the desired NH pointer or NT pointer into the next level, as dictated by the type bit of the entry.

Figure 12:
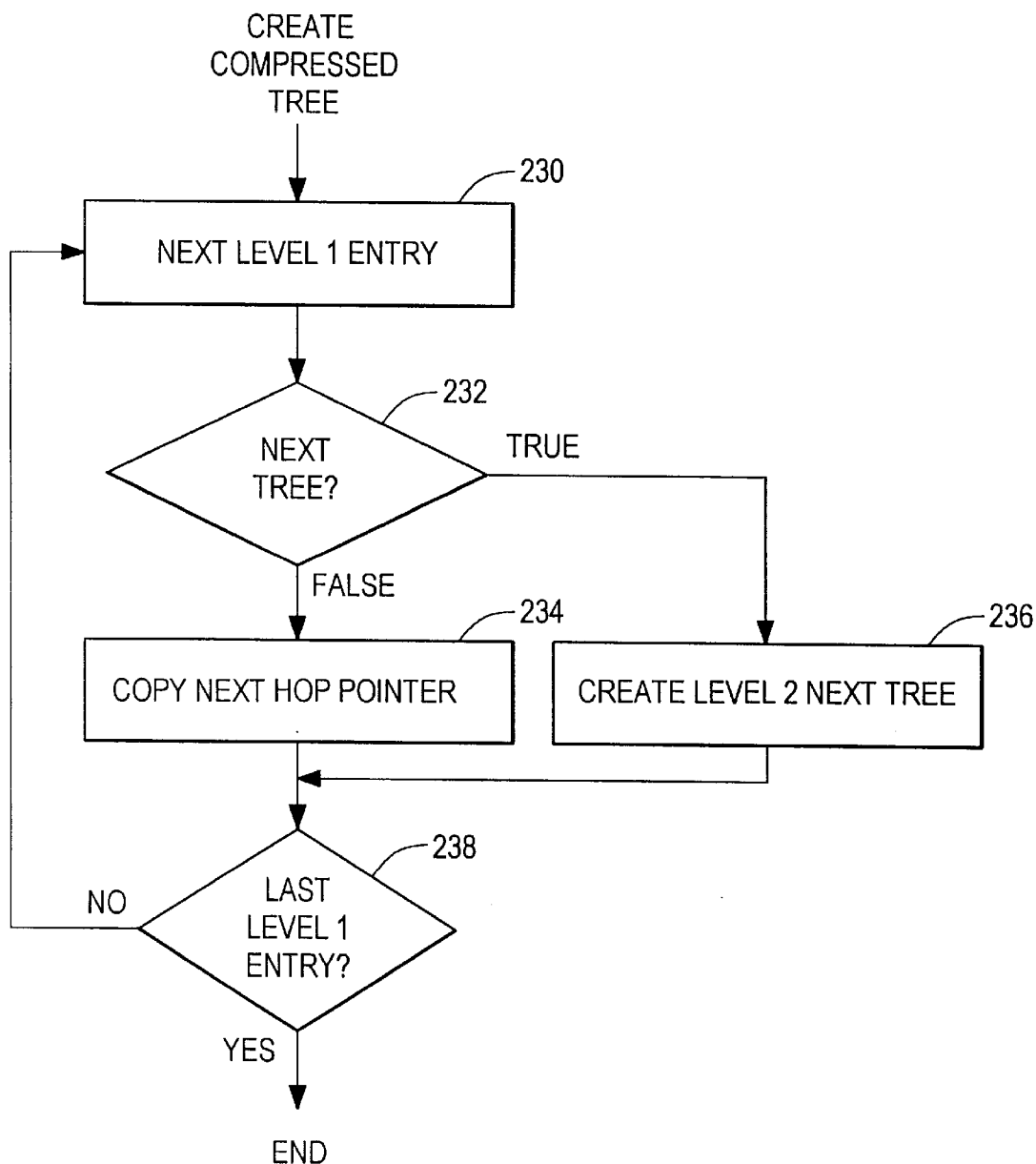
FIGS. 12 through 14 are flow diagrams depicting how the compressed tree of FIG. 8 is generated from the uncompressed tree of FIG. 7.
Figure 13:
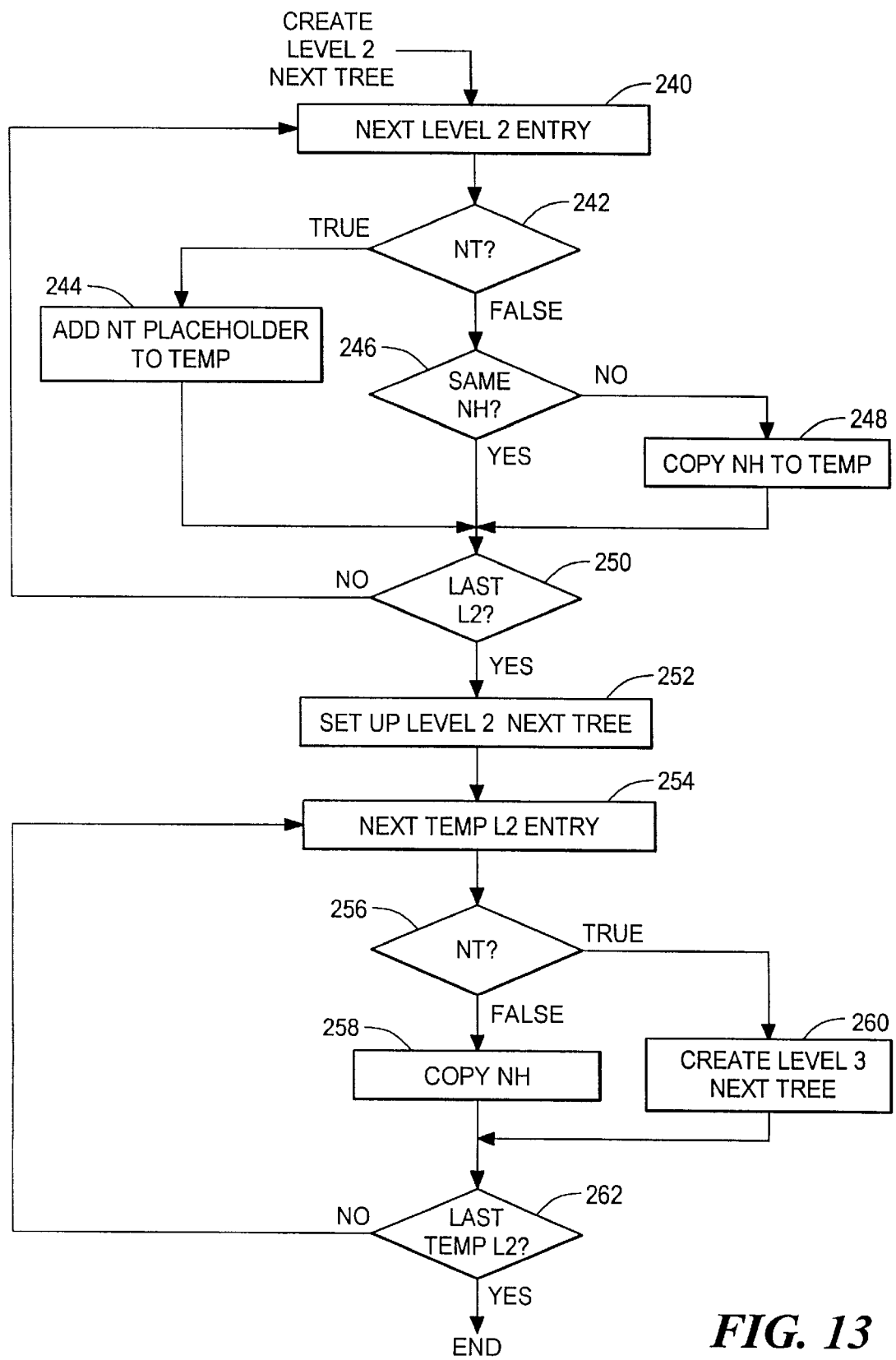
Figure 14:
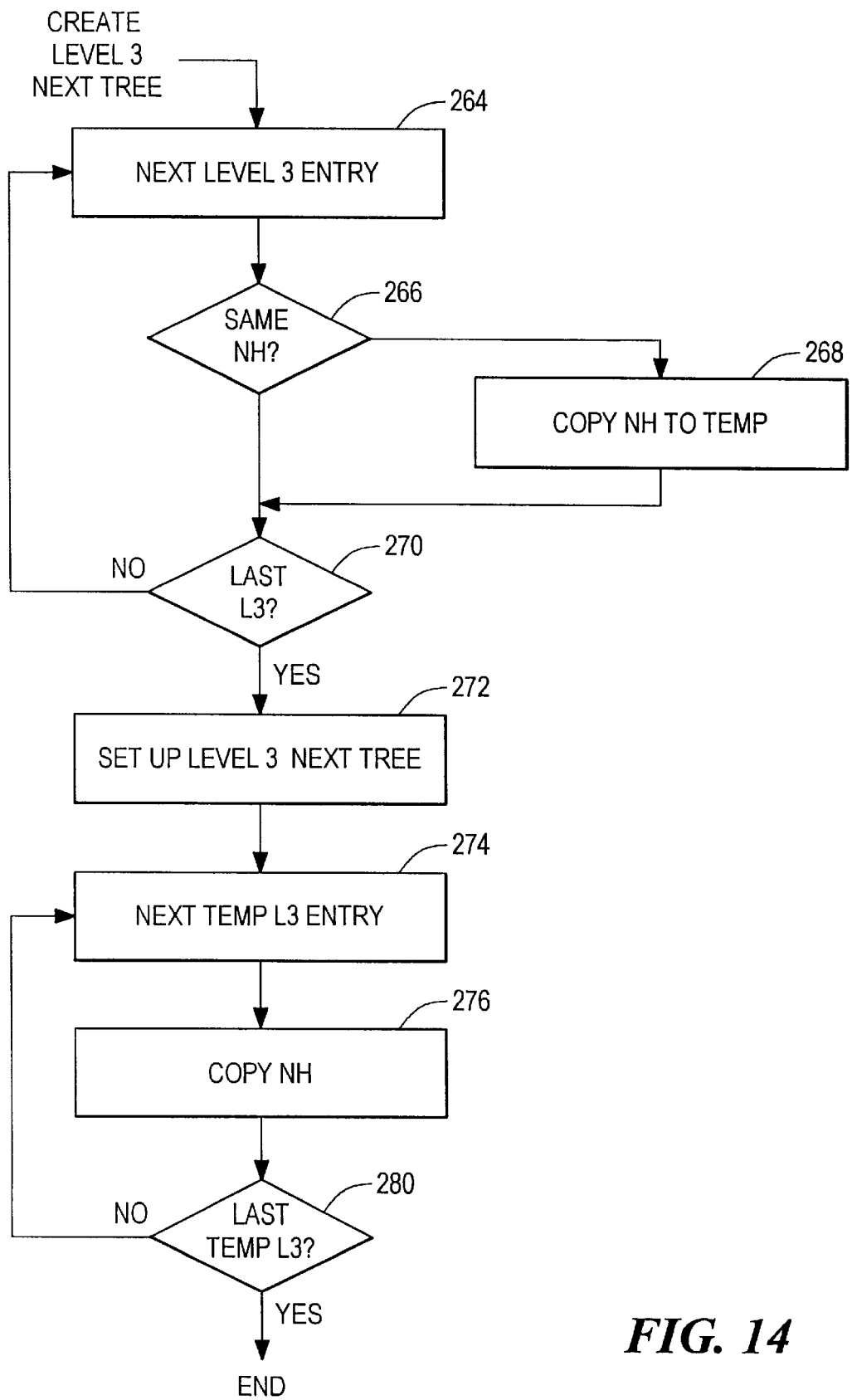
Figure 15:
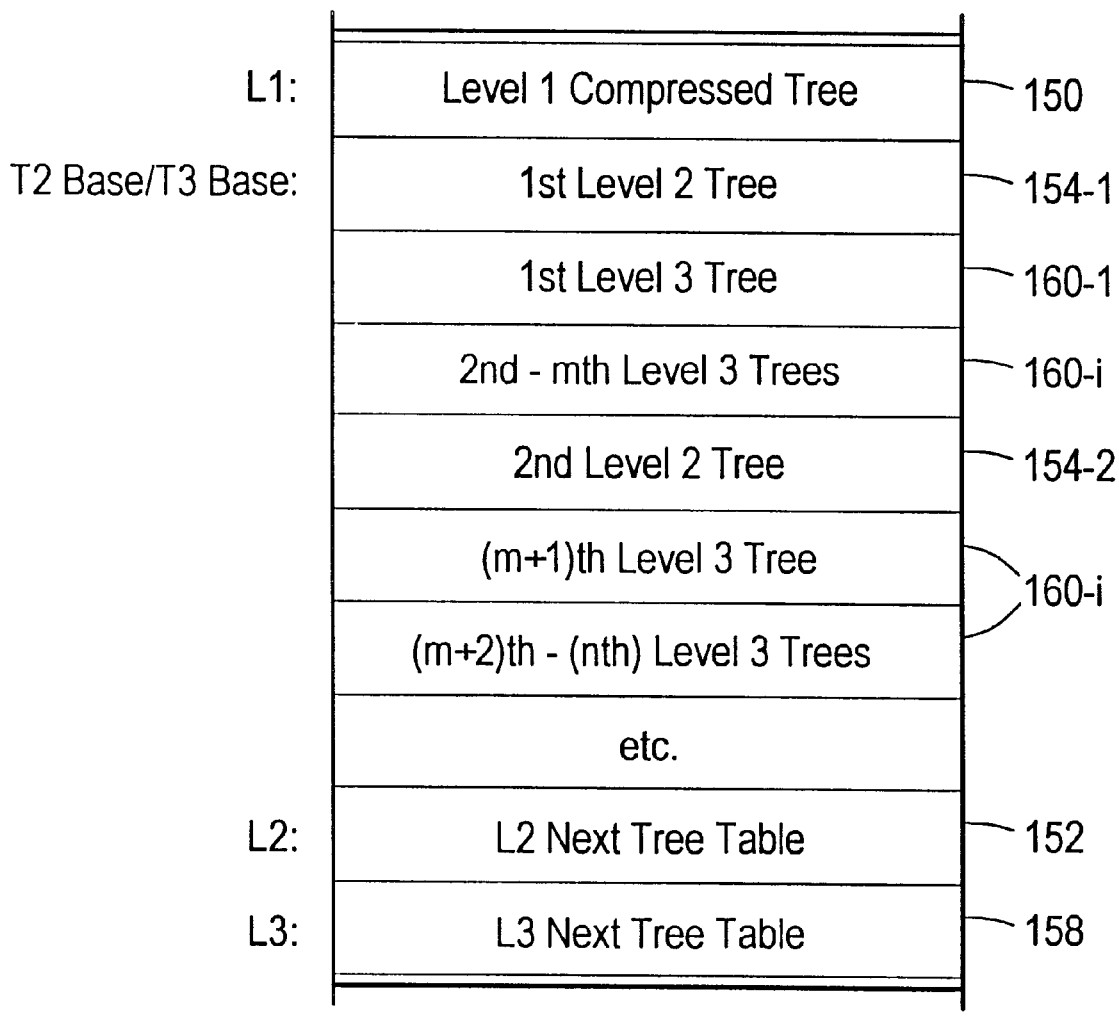
FIG. 15 is a memory map of a portion of the address resolution memory of FIG. 9 showing the detailed arrangement of a portion of a single compressed tree data structure stored therein.

FIGS. 12 through 14 show the manner in which the compressed tree forwarding table 139 of FIG. 8 is created from the corresponding uncompressed tree routing table of FIG. 7. FIG. 15 shows an example portion of a compressed tree forwarding table 139 as it resides within the system controller 12 during its creation. The forwarding tables 139 are re-created and distributed periodically by the system controller 12 during operation of the router 10. This calculation is done frequently so as to minimize the forwarding of frames along stale routes.

As a first step 230 in the process of FIG. 12, an entry is retrieved from the uncompressed level 1 tree 144. A convenient starting location is entry 0, which corresponds to IP address [31:16]=0.0. For each non-null entry, the NEXT TREE bit is tested at step 232. If the NEXT TREE bit is FALSE, indicating that the entry is a leaf pointer, then at step 234 an NH pointer is placed in the corresponding entry in the level-1 compressed tree 150. The NH pointer is the address of an entry in the global IP interface table 141 of FIG. 6 for the interface corresponding to the IP address stored in the level-1 routing entry 138 pointed to by the level-1 entry being processed.

If the NEXT TREE bit of the entry in the level-1 uncompressed tree 144 is TRUE, then a level 2 next tree 154 is created at step 236. This process is described below with reference to FIG. 13.

After the execution of either step 234 or step 236, it is determined in step 238 whether all of the entries from the level-1 uncompressed tree 144 have been processed. If not, the process returns to step 230 to process the next entry. Otherwise, the process of creating the compressed tree forwarding table 139 is complete.

The special pointers 149 are not traversed during the compression process. The routing entries pointed to by the special pointers 149 are also pointed to by fill leaves associated with routes in the level-2 or level-3 trees beneath the level-1 next tree entry, and thus are processed during the compression of those level-2 and/or level-3 trees.

FIG. 13 shows the process of creating a level 2 compressed tree 154. The process is a "two-pass" process, as reflected in the loops shown as steps 240 through 250 and steps 252 through 262, respectively. During the first pass, the NEXT TREE (NT) indicator is checked for each entry of the level-2 uncompressed tree 146 at step 242. If NT is TRUE, indicating that the pointer in the level-2 uncompressed tree 146 contains a NEXT TREE pointer, then at step 244 a next tree placeholder is added to a temporary list used to accumulate compressed entries during the first pass. If the NT indicator is FALSE, indicating that the entry contains a NEXT HOP (NH) pointer, then at step 246 it is determined whether the NH pointer is the same as any NH pointers already stored in the temporary list. If not, then at step 248 the NH pointer is added to the temporary list. The result of the first pass is the creation of a temporary list, which is a compressed version of the level-2 uncompressed tree 146 by virtue of containing only one copy of each distinct NH pointer.

The process then enters the second pass, in which the compressed level-2 tree 154 is actually created. At step 252, actions are taken to set up a level-2 compressed tree 154. Based on the size of the temporary list created during the first pass, it is determined whether the compressed level-2 tree to be created should be sparse or dense. If the number of entries in the temporary list is more than 32, then storage for a 256-entry dense tree 154 is allocated. Otherwise, storage for a sparse tree 154 is allocated. The storage allocated for a sparse tree 154 is the multiple of four entries that is equal to or greater than the number of entries in the temporary list. After the level-2 tree has been created, an NT entry is placed in the level-2 next tree table 152 pointing to the first entry of the newly allocated compressed level-2 tree 154. Also, an NT entry is placed in the level-1 compressed tree 150 pointing to the NT entry in the level-2 next tree table 152.

The process then proceeds to step 254, in which an entry is retrieved from the temporary list created during the first pass. At step 256 it is determined whether this is a NEXT TREE (NT) placeholder. If not (i.e., the entry is an NH pointer), then at step 258 the NH pointer is copied to the level-2 compressed tree 154. If the level-2 compressed tree being created is a dense tree, then the NH pointer is placed at the location having the same index as the NH pointer from the uncompressed tree 146. If the level-2 compressed tree being created is a sparse tree, then the NH pointer is placed in the sparse tree along with an index I indicating the largest value of IP [15:8] for which the NH pointer should be used. The entries in the sparse trees are stored in ascending order of the index values I1, I2, etc.

If in step 256 it is determined that the entry is a NEXT TREE placeholder, then the process proceeds to step 260 in which a new level-3 compressed tree 160 is set up. This process is described with reference to FIG. 14 below. After the last temporary entry has been processed as determined at step 262, the process of FIG. 13 is complete, and the process of FIG. 12 resumes at step 238.

FIG. 14 shows the process by which level-3 compressed trees 160 are created. The process is analogous to the process for level-2 next trees described above. Because in the illustrated embodiment there are no levels beyond the third level, no provision need be made for NEXT TREE entries in the third level. During a first pass from steps 264 through 270, the process creates a compressed temporary list of distinct NH pointers, and then in steps 272 through 280 creates the level-3 tree 160. As in the case of level-2 trees 146, the level-3 compressed tree created by the process of FIG. 14 may be either dense or sparse. The processing for each case is analogous to the corresponding case at level 2.

The processing shown in FIGS. 12 through 14 has a recursive nature, which is illustrated in the exemplary resulting memory map shown in FIG. 15. In memory, a single level-1 compressed tree 150 is followed by a first level-2 compressed tree 154-1, which is followed by one or more level-3 compressed trees 160-i associated with entries in the preceding level-2 compressed tree 154-1. This pattern repeats for all the level-2 and level-3 compressed trees that exist in the forwarding table. This section is followed by the level-2 next tree table 152 and the level-3 next tree table 158. After the forwarding table 139 of FIG. 15 has been created, it is distributed to the line cards 14 and 16 and used in the above-described manner to determine next hop addresses for incoming packets.

On the left in FIG. 15 are shown mnemonic labels of addresses that correspond to the pointers in the level pointer block 210. In the illustrated embodiment the T2 Base pointer 216 and T3 Base pointer 220 have the same values. In alternative embodiments it may be desirable to segregate the level-2 and level-3 trees, in which case it would be advantageous to use corresponding different values for the T2 and T3 base pointers.

While the process described with reference to FIGS. 12–15 achieves compression by virtue of eliminating redundant "next hop" information, it may be desirable in alternative embodiments to use a slightly different method of creating the compressed tree to advance other goals. For example, it may be desirable to examine pointer values and eliminate redundant pointers. In such an embodiment, there may be redundant next hop information in the compressed tree if multiple routing entries have the same next hop value. Alternatively, it may be desirable to test for other information in the routing table that is non-redundant, and to store otherwise redundant entries in the compressed table in order to capture the non-redundant information. For example, two different addresses may map to the same next hop value, but have different Quality of Service parameters. In such a case it would be useful to store different entries in the compressed tree. Although both entries would map to the same interface identifier, they would map to different sets of QOS parameters and thus result in different QOS processing.

Although in the illustrated embodiment both the compressed and uncompressed tree are divided into three levels, it may be desirable in alternative embodiments to divide these trees into different numbers of levels. In particular, it may be desirable to use more levels for network addresses that are longer than 32 bits. It may also be desirable to associate different fields of the network address with the levels of the trees. For example, in an alternative embodiment bits [31:20] might be associated with level 1, bits [19:8] with level 2, and bits [7:0] with level 3. In other alternative embodiments it may be desirable to shuffle the address fields with respect to the levels. For example it may be advantageous for level-1 to be associated with a middle address field or a lower address field rather than an upper address field.

Methods and apparatus for network routing using compressed tree forwarding tables have been described. It will be apparent to those skilled in the art that modification to and variation of the above-described methods and apparatus are possible without departing from the inventive concepts disclosed herein. Accordingly, the invention should be viewed as limited solely by the scope and spirit of the appended claims.

What is claimed is:

1. Apparatus for identifying a next hop address of a network to which packets should be forwarded, the apparatus comprising a memory storing a forwarding table, the forwarding table comprising a first-level table having entries directly addressable by a first field of address bits from an address field of the packets, and a second-level table having entries associatively addressable by a second field of address bits from the address field of the packets, the first-level table being operative to provide (i) a next hop index indicative of a next hop network address for those packets having addresses for which the first field of address bits is sufficient to determine the next hop address, and (ii) a pointer to the second-level table for those packets having addresses for which the first field of address bits is not sufficient to determine the next hop address, and the second-level table being operative to provide a next hop index indicative of a next hop network address for those packets having address for which the first and second fields of address bits are sufficient to determine the next hop address.

2. Apparatus according to claim 1, wherein the forwarding table further comprises a third-level table having entries associatively addressable by a third field of address bits from the address field of the packets, and wherein the second-level table is operative to provide a pointer to the third-level table for those packets having addresses for which the first and second fields of address bits are not sufficient to determine the next hop address, and the third-level table is operative to provide a next hop index indicative of the next hop address for those packets having addresses for which the first, second and third fields of address bits are sufficient to determine the next hop address.

3. Apparatus according to claim 2, wherein the forwarding table further comprises a table at each of one or more additional levels, each table having entries associatively addressable by a corresponding additional field of address bits from the address field of the packets, wherein each table is operative to provide a pointer to the table in the next level for those packets having addresses for which the address bits from the first field through the corresponding additional field are not sufficient to determine the next hop address, and each table is operative to provide a next hop index indicative of the next hop address for those packets having addresses for which the address bits from the first field through the corresponding additional field are sufficient to determine the next hop address.

4. Apparatus according to claim 1, wherein the second-level table is a sparse second-level table containing fewer entries than the number of unique values of the second field of the address, and wherein the forwarding table further comprises a dense second-level table being directly addressable by the second field of address bits from the address field of the packets, and wherein (i) the first-level table is operative to selectively provide pointers to the sparse and dense second-level tables based on the first field of the address field of the packets, (ii) the sparse second-level table provides a next hop index indicative of the next hop address when a pointer to the sparse second-level table is provided by the first-level table for a given packet, and (iii) the dense second-level table provides a next hop index indicative of the next hop address when a pointer to the dense second-level table is provided by the first-level table for a given packet.

5. Apparatus according to claim 4, wherein the number of storage locations in the dense second-level table is equal to the number of unique values of the second address field, the number of pointers stored in the dense second-level table is greater than or equal to a first number substantially smaller than the number of unique values of the second address field, the number of pointers stored in the sparse second-level table is less than the first number, and the number of storage locations in the sparse second-level table is the smallest multiple of a storage block size that is sufficient to store the number of pointers stored in the sparse second-level table.

6. Apparatus according to claim 5, wherein the number of unique values of the second address field is 256 and the first number is 32.

7. Apparatus according to claim 1, wherein the forwarding table further comprises a third-level table having entries associatively addressable by a third field of address bits from the address field of the packets, and wherein one of the second-level tables is operative to provide a pointer to the third-level table for those packets having addresses for which the first and second fields of address bits are not sufficient to determine the next hop address, and the third-level table is operative to provide a next hop index indicative of the next hop address for those packets having addresses for which the first, second and third fields of address bits are sufficient to determine the next hop address.

8. Apparatus according to claim 1, wherein the forwarding table further comprises additional second-level tables each having entries associatively addressable by the second field of address bits from the address field of the packets, and wherein the first-level table is operative to selectively provide pointers to the different second-level tables based on the first field of the address field of the packets, and each second-level table provides a next hop index indicative of the next hop address when a corresponding pointer to the respective second-level table is provided by the first-level table for a given packet.

9. Apparatus according to claim 8, wherein the forwarding table further comprises a mapping table operative to map each pointer in the first-level table to a corresponding second-level table.

10. A method of operating a network device, comprising the steps of:
  establishing and maintaining an uncompressed multi-level tree routing table, each level of the routing table containing at least one table directly addressable by a corresponding field of an address field of received packets, each table being operative to provide a pointer indicative of an address of a next hop network to which packets are to be forwarded, the number of unique pointer values in each table being substantially less than the number of pointers in the table; and
  periodically creating an updated compressed multi-level tree forwarding table from the uncompressed routing table and distributing the updated forwarding table to forwarding controllers within the network device for use by the forwarding controllers in routing packets received by the network device, the compressed forwarding table containing at least one table at each of one or more levels, each table reflecting the same forwarding information as a counterpart table of the uncompressed routing table using a number of pointers substantially equal to the number of unique pointer values.

11. Apparatus used to determine next hop addresses of networks to which data packets are to be forwarded, each data packet including an address field containing an address indicative of a network node to which the packet is ultimately to be delivered, the apparatus including memory storing a data structure, the data structure comprising:

a plurality of routing entries, each routing entry containing a key address, a subnet mask value, and a next hop address which is the address of a network to which packets whose address matches the key address in a number of most-significant bit positions indicated by the subnet mask value are to be forwarded, the routing entries being divided into at least two classes according to subnet mask values such that a first class of routing entries includes level-1 routing entries whose subnet mask values are no more than a first number, and a second class of routing entries include level-2 routing entries whose subnet mask values are greater than the first number and no more than the sum of the first number and a second number, the level-2 routing entries being further divided into groups such that the key addresses of the routing entries within each group match each other in the first number of most significant bit positions; and a plurality of pointers, the pointers being associated with addresses of packets and being divided into at least two classes according to fields of the addresses with which the pointers are associated, a first class of pointers being level-1 pointers associated with a first field containing the first number of the most significant address bits of the address, and a second class of pointers being level-2 pointers associated with a second sub-field containing the second number of the next most significant address bits of the address, the level-1 pointers being arranged in a level-1 tree indexed by the first field of the address, the level-2 pointers being divided into a plurality of level-2 trees according to groups of the level-2 routing entries with which the level-2 pointers are associated, each level-2 tree being indexed by the second field of the address, the pointers at both the first and second level including real leaf pointers and fill leaf pointers, each real leaf pointer pointing to an associated routing entry having a key address value equal to the index of the pointer in the data structure, each fill leaf pointer pointing to an associated routing entry whose key address value best matches the index of the fill leaf pointer based on the value of the subnet mask, the pointers at the first level including next tree pointers each pointing to a corresponding level-2 tree containing a pointer to a routing entry whose key address is equal to the index of the next tree pointer in the data structure.

12. Apparatus used to determine the addresses of next hop networks to which data packets are to be forwarded, each data packet including an address field having an address indicative of a network to which the packet is ultimately to be delivered, the apparatus including a memory storing a data structure, the data structure comprising a plurality of pointers, the pointers being associated with addresses of packets and being divided into two or more classes according to fields of the addresses with which the pointers are associated, a first class of pointers being level-1 pointers associated with a first field containing a first number of the most significant address bits of the address, the level-1 pointers being arranged in a level-1 binary tree indexed by the first field of the address, a second class of pointers being level-2 pointers associated with a second sub-field containing a second number of the next most significant address bits of the address, the level-2 pointers being divided into a plurality of level-2 binary trees each being indexed by the second field of the address, the level-1 pointers including next hop pointers and next tree pointers, each next hop pointer identifying the address of a network to which packets having an address whose first field is equal to the index of the next hop pointer in the level-1 binary tree should be forwarded, and each next tree pointer identifying a level-2 binary tree which should be used to determine the address of a network to which packets having an address whose first field is equal to the index of the next tree pointer in the level-1 binary tree should be forwarded, each level-2 binary tree including next hop pointers each identifying the address of a network to which packets having an address whose second field is equal to the index of the next hop pointer in the level-2 binary tree and whose first field is equal to the index of the next tree pointer in the level-1 binary tree that identifies the level-2 tree containing the next hop pointer should be forwarded.

13. A method of operating a network device, comprising the steps of:

establishing and maintaining at a centralized controller within the network device a multi-level tree routing table, each level of the routing table containing one or more binary trees indexed by a corresponding field of an address field of received packets, each location in each binary tree containing a pointer to a routing entry indicating the address of a next hop network to which packets whose address contains the index value of the pointer are to be routed, the number of routing entries associated with each binary tree being generally being less than the number of pointers, so that in general multiple pointers in a given binary tree point to the same routing entry; and periodically creating an updated compressed multi-level tree forwarding table from the uncompressed routing table and distributing the updated forwarding table to forwarding controllers within the network device for use by the forwarding controllers in routing packets received by the network device, the compressed forwarding table containing binary trees at one or more levels, each binary tree reflecting the same forwarding information as a counterpart binary tree of the routing table using a number of pointers substantially equal to the number of unique routing entries associated with the counterpart binary tree.

14. Apparatus used to determine the addresses of next hop networks to which data packets are to be forwarded, comprising:

a memory for storing a plurality of level pointer blocks and a plurality of forwarding tables, each forwarding table containing data structures associated with values of one or more fields of the address field of the data packets, the data structures containing entries identifying the addresses of next hop networks to which data packets having address sub-fields containing values associated with the data structures are to be forwarded, and each level pointer block being associated with a corresponding different one of the forwarding tables and containing pointers identifying the data structures within the associated forwarding table;

one or more input buffers operative to receive next hop address lookup requests, each lookup request containing an address and an identifier of a level pointer block to be used in performing the lookup;

selection logic coupled to the input buffers, the selection logic being operative to select among the following: (i) the lookup requests in the different input buffers, (ii) the address and the level pointer block identifier contained in each request, and (iii) the fields of the address contained in each request;

a cache coupled to the memory, the cache being operative to store for the duration of a lookup a level pointer block retrieved from the memory upon the initiation of the lookup;

a memory input buffer coupled to the memory, the memory input buffer being operative to store a plurality of forwarding table data structure entries retrieved from the memory during a lookup;

addressing logic having inputs coupled to the selection logic, the cache, and the memory input buffer, the addressing logic being operative to calculate the addresses of level pointer blocks within the memory and the addresses of forwarding table data structure entries within the memory based on (i) values selected by the selection logic, (ii) values stored in the cache, and (iii) values stored in the memory input buffer, the addressing logic also being operative to provide the calculated addresses to the memory in order to retrieve level pointer blocks and forwarding tables therefrom;

comparison logic having inputs coupled to the selection logic and the memory input buffer, the comparison logic being operative during a lookup to compare a value selected by the selection logic to one or more forwarding table data structure entries stored in the memory input buffer; and one or more output buffers coupled to the memory input buffer, each output buffer being associated with a corresponding input buffer, each output buffer being operative to store the results of lookups whose requests are received in the associated input buffer and to provide the results as responses to the lookup requests, the result of each lookup including a next hop address from a selected forwarding table data structure entry stored in the memory output buffer, the selected entry being the entry indicated by the comparison logic as matching the value selected by the selection logic.

\* \* \* \* \*